United States Patent
Umeno

(10) Patent No.: US 9,937,899 B2
(45) Date of Patent: Apr. 10, 2018

(54) WIPER ARM AND VEHICLE WIPER APPARATUS EQUIPPED THEREWITH

(71) Applicant: ASMO CO., LTD., Kosai, Shizuoka-pref. (JP)

(72) Inventor: Takashi Umeno, Kosai (JP)

(73) Assignee: ASMO CO., LTD., Kosai (JP)

( * ) Notice: Subject to any disclaimer, the term of this patent is extended or adjusted under 35 U.S.C. 154(b) by 658 days.

(21) Appl. No.: 14/507,836

(22) Filed: Oct. 7, 2014

(65) Prior Publication Data
US 2015/0113754 A1    Apr. 30, 2015

(30) Foreign Application Priority Data

Oct. 28, 2013   (JP) .................................. 2013-223713
Nov. 5, 2013    (JP) .................................. 2013-229648

(51) Int. Cl.
*B60S 1/52* (2006.01)
*B60S 1/48* (2006.01)

(52) U.S. Cl.
CPC .............. *B60S 1/522* (2013.01); *B60S 1/482* (2013.01)

(58) Field of Classification Search
CPC .......... B60S 1/522; B60S 1/524; B60S 1/482; B60S 1/3862
(Continued)

(56) References Cited

U.S. PATENT DOCUMENTS 3,427,675 A * 2/1969 Tibbet .................... B60S 1/3415
                                                       15/250.02
3,827,101 A * 8/1974 Wubbe .................... B60S 1/522
                                                       15/250.04
(Continued)

FOREIGN PATENT DOCUMENTS

EP    1520759     *  4/2005
JP    S51-121933 U   10/1976
(Continued)

OTHER PUBLICATIONS

English language translation of the following: Office action dated Jan. 24, 2017 from the JPO in a Japanese patent application No. 2013-223713 corresponding to the instant patent application. This office action translation is submitted now in order to supplement the understanding of the cited reference which is being disclosed in the instant Information Disclosure Statement.

*Primary Examiner* — Gary Graham
(74) *Attorney, Agent, or Firm* — SOLARIS Intellectual Property Group, PLLC

(57) ABSTRACT

A wiper arm comprising an arm main body; a first nozzle portion disposed at a first predetermined position in a length direction of the arm main body; a second nozzle portion disposed at a second predetermined position in the length direction of the arm main body, and jets washing fluid toward a position that is different from an impact point of the washing fluid jetted from the first nozzle portion; a first line hose accommodated in the arm main body and connected to the first nozzle portion; a second line hose accommodated in the arm main body side-by-side with the first line hose and connected to the second nozzle portion; and a hose retention unit attached to the arm main body and that comprises: a first hose retention portion retaining the first line hose; and a second hose retention portion provided integrally with the first hose retention portion and retaining the second line hose.

11 Claims, 11 Drawing Sheets

(58) Field of Classification Search
USPC .......................... 15/250.04, 250.02, 250.351
See application file for complete search history.

(56) References Cited

U.S. PATENT DOCUMENTS

| | | | | |
|---|---|---|---|---|
| 4,133,071 A * | 1/1979 | Jaske | ................. | B60S 1/32 15/250.04 |
| 5,203,049 A * | 4/1993 | Nogawa | ................. | B60S 1/522 137/625.44 |
| 5,239,726 A * | 8/1993 | Bianco | ................. | B60S 1/34 15/250.31 |
| 5,724,699 A * | 3/1998 | Bexten | ................. | B60S 1/32 15/250.04 |
| 5,894,626 A * | 4/1999 | Edele | ................. | B60S 1/522 15/250.04 |
| 6,442,788 B1 * | 9/2002 | Fleischer | ................. | B60S 1/522 15/250.04 |
| 6,934,992 B2 * | 8/2005 | Sato | ................. | B60S 1/522 15/250.04 |
| 2015/0344000 A1 * | 12/2015 | Kruse | ................. | B60S 1/522 134/34 |

FOREIGN PATENT DOCUMENTS

JP   2002-536244 A   10/2002
JP   2003-48517 A   2/2003

* cited by examiner

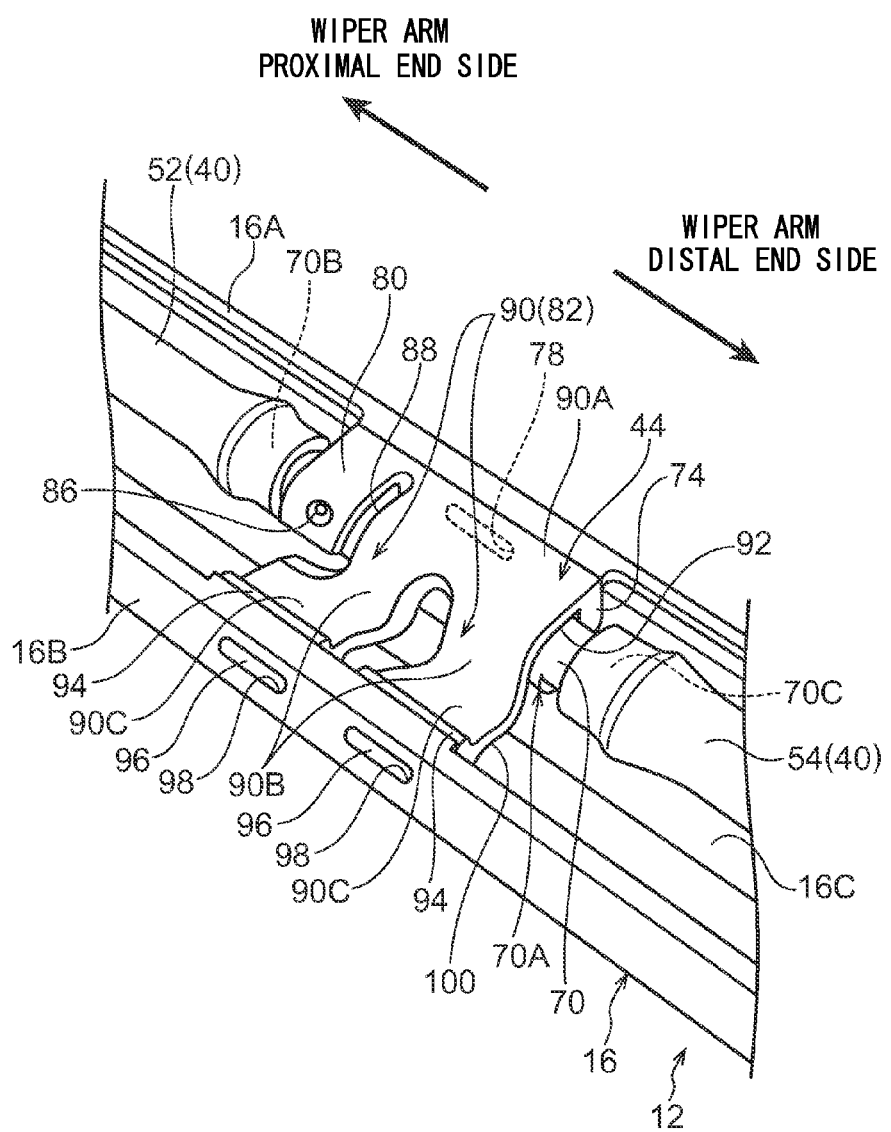

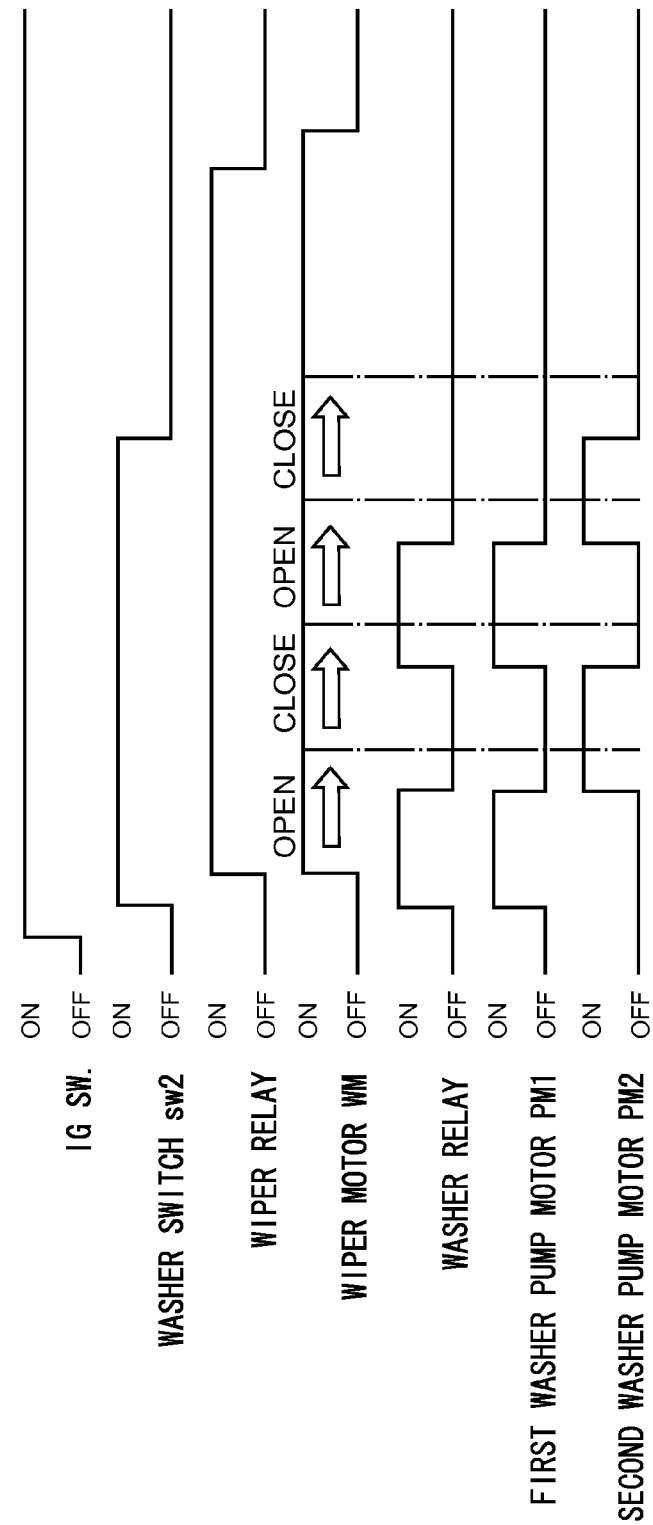

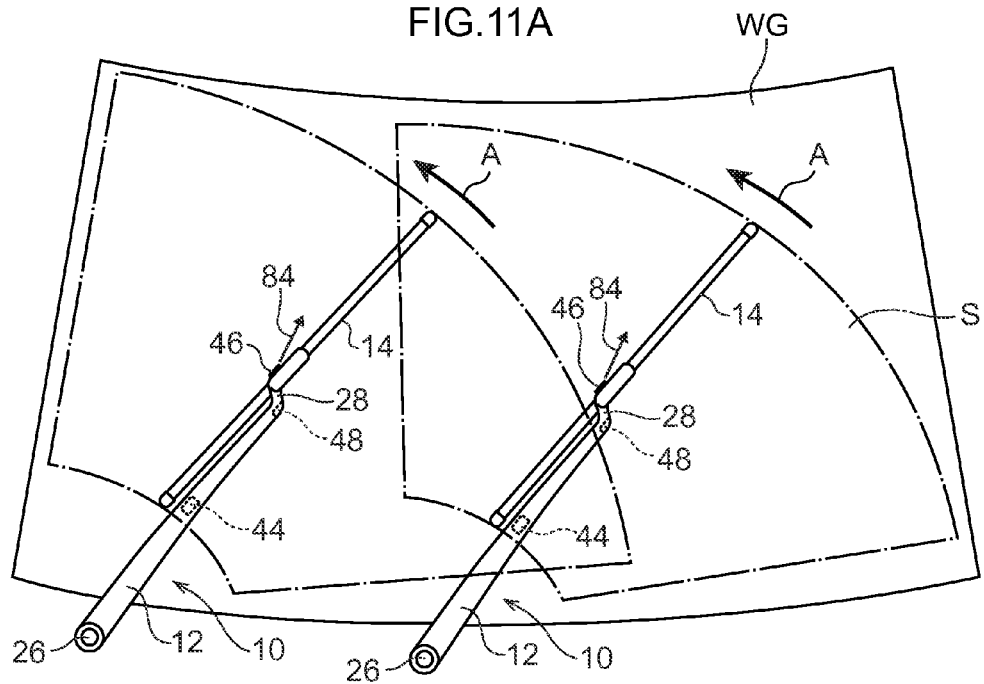
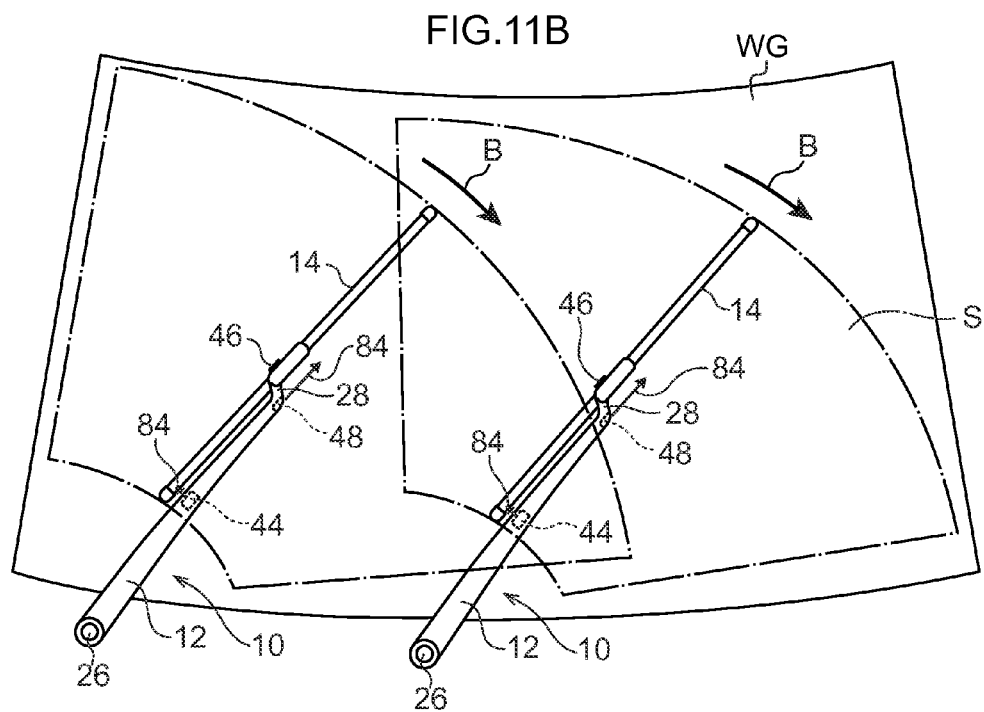

WIPER ARM AND VEHICLE WIPER APPARATUS EQUIPPED THEREWITH

CROSS-REFERENCE TO RELATED APPLICATION

This application claims priorities under 35 USC 119 from Japanese Patent Applications No. 2013-223713 filed Oct. 28, 2013 and No. 2013-229648 filed Nov. 5, 2013, the disclosures of which are incorporated by reference herein.

BACKGROUND OF THE INVENTION

Technical Field

The present invention relates to a wiper arm equipped with a nozzle that jets a washing fluid and to a wiper apparatus for a vehicle that is equipped with the wiper arm.

Related Art

Vehicle wiper apparatuses include an apparatus in which a washing fluid is jetted (supplied) from a washer nozzle mounted at a wiper arm to a wiping direction forward side of a wiper blade. For example, in (a wiper arm of) a vehicle wiper apparatus disclosed in Japanese Patent Application National Publication No. 2002-536244, a structure is employed in which respective washer nozzles are disposed at a length direction intermediate portion and distal end portion of the wiper arm, and the nozzles are connected to a single-line hose.

In an apparatus according to this related art, the washing fluid is jetted through the nozzles disposed at two locations, the intermediate portion and the distal end portion, from the single-line hose. Consequently, because of limitations on supplied amounts of washing fluid to be jetted from the nozzles and the like, satisfactory wiping performance is not obtained.

Meanwhile, in a vehicle wiper apparatus (washer apparatus) disclosed in Japanese Patent Application Laid-Open (JP-A) No. 2003-48517, a structure is employed in which a nozzle that jets to the wiping direction forward side during the going motion and a nozzle that jets to the wiping direction forward side during the return motion are each provided at, for example, a length direction intermediate portion of a wiper blade, and these nozzles are connected to a two-line hose.

In this vehicle wiper apparatus, the wiping direction and position of the wiper arm are sensed at a wiper motor, and a washer pump-driving current that drives two pumps is directly switched via a cam switch provided at the wiper motor. Thus, a structure is provided in which jetting to the wiping direction forward side is switched between the mutually opposite directions.

SUMMARY

However, according to this related art, although the washing fluid is jetted through the nozzles provided at the two locations from the two-line hose and excellent wiping performance may be obtained, the two-line hose must be arranged within the wiper arm that performs reciprocating angular motions. Therefore, managing the hoses to keep them stable is difficult. In particular, because the hoses are made of rubber, a hose subjected to an external force may lose its connection or be easily bent into a kink or the like, so appropriate jetting of the washing fluid may be impeded. Thus, there is room for improvement in the related art in the matter of arranging a two-line hose with nozzles within a wiper arm in a stable state. Moreover, because an increase in the number of components in association with an improvement would lead complicate assembly operations, it is desirable to greatly suppress any increase in the number of components.

In consideration of the situation described above, subjects of the present invention are to provide a wiper arm that, when a two-line hose is arranged within an arm main body, may maintain the hoses in a stable state of arrangement and that may suppress an increase in a number of components, and to provide a vehicle wiper apparatus that employs this wiper arm.

A wiper arm according to the present invention includes: an arm main body, a cross-sectional shape thereof in a direction orthogonal to an arm length direction is a "U" shape; a first nozzle portion that is disposed at a first predetermined position in a length direction of the arm main body, and that is provided with a jetting hole for washing fluid; a second nozzle portion that is disposed at a second predetermined position in the length direction of the arm main body, and that is provided with a jetting hole that jets washing fluid toward a position that is different from an impact point of the washing fluid jetted from the jetting hole of the first nozzle portion; a first line hose that is accommodated in the arm main body and that is connected to the first nozzle portion; a second line hose that is accommodated in the arm main body side-by-side with the first line hose and that is connected to the second nozzle portion; and a hose retention unit that is attached to the arm main body and that includes a first hose retention portion that retains the first line hose and a second hose retention portion that is provided integrally with the first hose retention portion and retains the second line hose.

According to the wiper arm with the structure described above, the arm main body of the wiper arm has a cross-sectional shape in the direction orthogonal to the arm length direction in a substantial letter-U shape. The two-line hose, the first line hose connected to the first nozzle portion and the second line hose connected to the second nozzle portion, are accommodated side-by-side in the arm main body. When the washing fluid is supplied to the first line hose, the washing fluid is jetted from the jetting hole of the first nozzle portion. When the washing fluid is supplied to the second line hose, the washing fluid is jetted from the jetting hole of the second nozzle portion toward a position different from an impact position of the washing fluid jetted from the jetting hole of the first nozzle portion. Thus, with the wiper arm according to the present invention, a two-line hose may be used to form the washing fluid from the nozzle portions provided at two locations into distinctively different jets. Thus, compared to a case of jetting washing fluid from nozzle portions provided at two locations of a single-line hose (for example, the related art recited in Japanese Patent Application National Publication No. 2002-536244), excellent wiping performance can be obtained.

In the present invention, the hose retention unit is attached to the arm main body. The first line hose is retained by the first hose retention portion provided at the hose retention unit, and the second line hose is retained by the second hose retention portion provided at the hose retention unit. Thus, the hose retention portions are provided one for each hose. Therefore, the state of arrangement of the first line hose and the second line hose is not complicated by angular motions of the wiper arm, and a stable state of arrangement may be maintained. Moreover, because the second hose retention portion is provided integrally with the first hose retention portion, the number of components is reduced compared to a structure in which hose retention portions are provided separately for the respective hoses.

BRIEF DESCRIPTION OF THE DRAWINGS

Embodiments of the present invention will be described in detail based on the following figures, wherein:

FIG. 4 is a magnified perspective view showing a state of attachment of a first nozzle and a hose retention unit provided at an intermediate position of the wiper arm shown in FIG. 1;

FIG. 10 is a timing chart showing switching timings of the vehicle wiper apparatus shown in FIG. 3;

FIG. 11A is a plan view, corresponding to FIG. 2, showing a state during turning of a wiper blade shown in FIG. 2 to one angular direction side; and FIG. 11B is a plan view, corresponding to FIG. 2, showing a state during turning of the wiper blade shown in FIG. 2 to the other angular direction side.

DETAILED DESCRIPTION OF THE INVENTION

Herebelow, a vehicle wiper apparatus 10 in accordance with an exemplary embodiment of the present invention is described using FIG. 1 to FIG. 11B.

Figure 2:
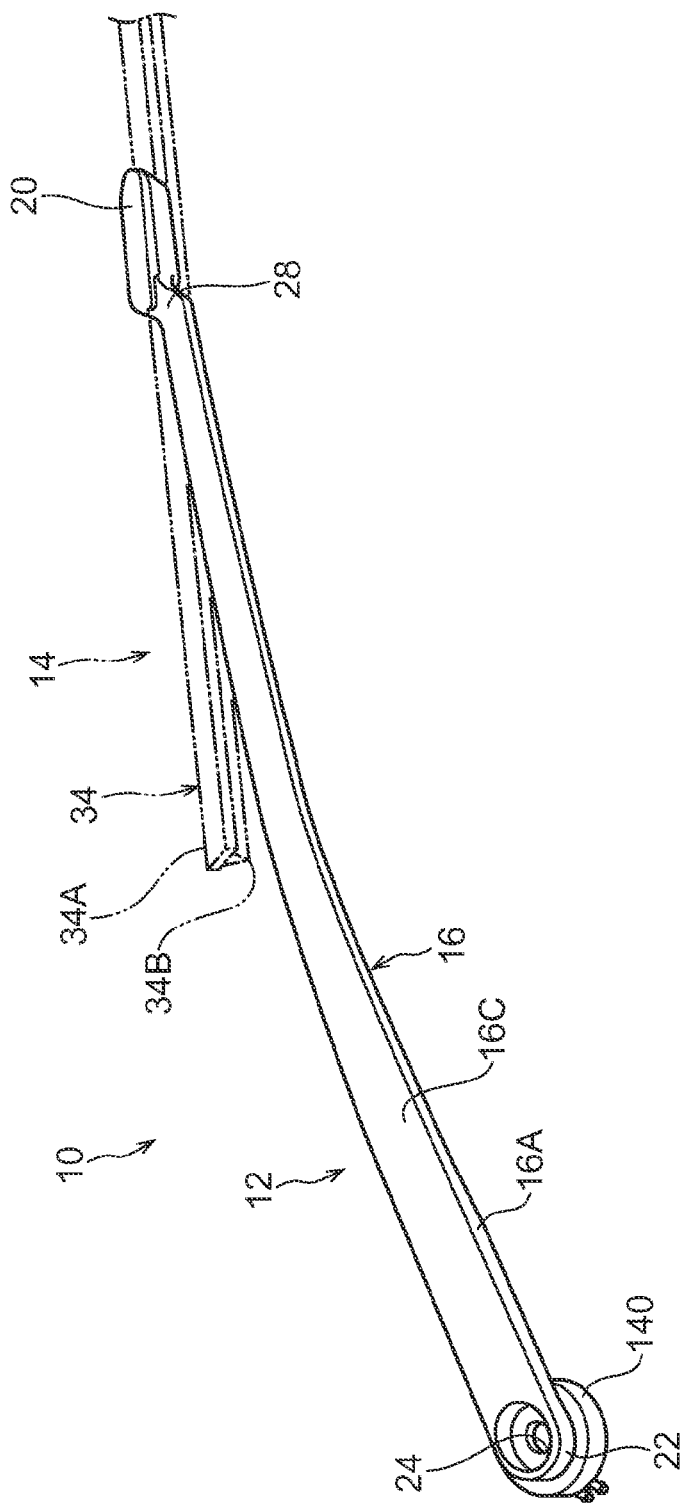
FIG. 2 is a perspective view in which the wiper arm shown in FIG. 1 is viewed from a front face side (a vehicle forward side)
Figure 3:
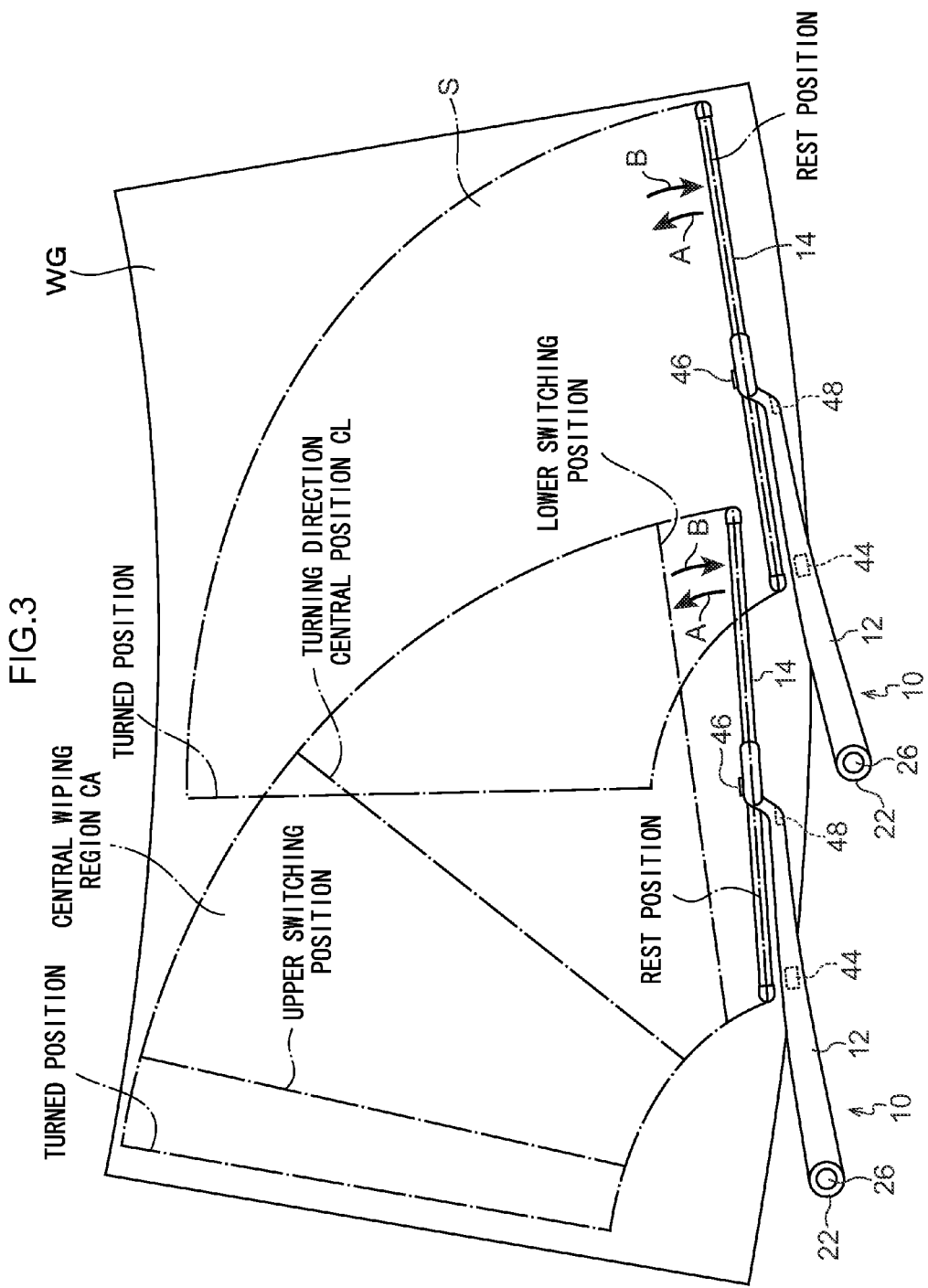
FIG. 3 is a plan view, viewed from the outer side (the vehicle forward side) of a windshield glass, showing the whole of a vehicle wiper apparatus in accordance with the present exemplary embodiment.

As shown in FIG. 3, the vehicle wiper apparatus 10 is structured with wiper arms 12 formed substantially in long, narrow shapes, and wiper blades 14 that wipe a wiped surface S of a windshield glass WG of the vehicle. First, the overall structure of the vehicle wiper apparatus 10 is outlined using FIG. 1 to FIG. 3.

—Overall Structure of the Wiper Arm 12—

Figure 1:
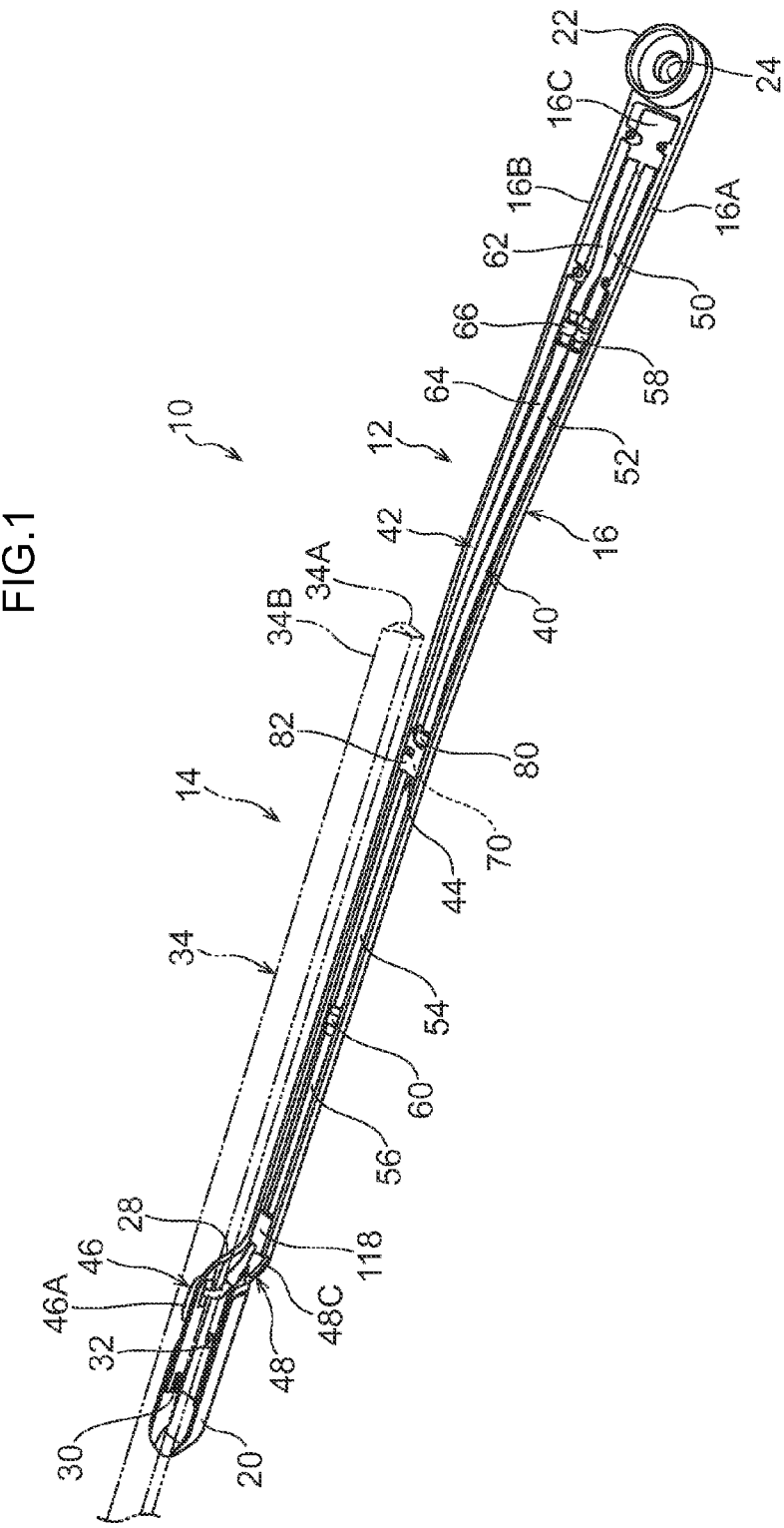
FIG. 1 is a perspective view in which a wiper arm in accordance with a present exemplary embodiment is viewed from a rear face side in a state in which a rear face cover has been removed.

As shown in FIG. 1 and FIG. 2, the exterior of each wiper arm 12 is structured by an arm main body 16, a rear face cover (not shown in the drawings) and a distal end cover 20. The arm main body 16 has an open cross-section structure, formed in a long, narrow shape. The rear face cover closes off a floor portion of the arm main body 16. The distal end cover 20 is attached to a distal end portion of the arm main body 16. Each of the arm main body 16, the rear face cover and the distal end cover 20 is fabricated of resin.

Specifically, the arm main body 16 is formed with a cross-sectional structure, if cut in the direction orthogonal to the length direction thereof, that is a substantial "U" shape (an open cross-section structure). The wiper arm 12 is disposed such that the opening side of the arm main body 16 is at the side thereof that faces the windshield glass WG. The arm main body 16 is provided with a pair of side wall portions 16A and 16B, which are disposed to oppose one another, and a top wall portion 16C that links the side wall portions 16A and 16B.

A fixing portion 22 is formed at a proximal end side of the arm main body 16. The fixing portion 22 is formed in the shape of a tube with a floor. A circular penetrating hole 24 is formed coaxially at an axial central portion of the floor portion of the fixing portion 22. A distal end portion of a pivot rod 26 (see FIG. 3) is inserted into the penetrating hole 24 from an arm lower side and fixed. Thus, a proximal end portion of the wiper arm 12 is fixed at the pivot rod 26. Thus, the wiper arms 12 turn integrally about the pivot rods 26 when the pivot rods 26 turn, A lateral inflection portion 28 is integrally formed at the distal end side of the arm main body 16. The lateral inflection portion 28 is inflected in a crank shape to one side in the arm width direction. As shown in FIG. 1, the distal end of the arm main body 16 is opened in the arm length direction. Respective substantial U-shaped slits 30 are formed in parallel in the side wall portions 16A and 16B disposed at the open end portion of the arm main body 16. An engagement hole 32 that opens in a rectangular shape is formed in the top wall portion 16C, disposed at the distal end side of the arm main body 16. A clip, which is not shown in the drawings, is inserted into the arm main body 16 in the arm length direction through the open side at the distal end of the arm main body 16, and is attached to the inside of the distal end portion of the arm main body 16. The clip is formed in a substantial "U" shape as viewed in a length direction thereof. Engaging protrusion portions formed at outer side faces of each of two side portions of the clip are inserted into the slits 30, and an engaging projection in a rectangular shape that is formed at a top portion of the clip is resiliently engaged with the engagement hole 32 from the arm lower side thereof. Thus, the clip is attached in a state of being accommodated at the inner side of the distal end portion of the arm main body 16. A spindle portion in a circular rod shape is formed integrally and coaxially at inner side faces of the two side portions of the clip. The spindle portion is turnably attached to a joining holder, which is described below, of the wiper blade 14.

In the state in which the clip has been attached, the distal end cover 20 is attached to the distal end portion of the arm main body 16. The distal end cover 20 is formed with a cross-sectional structure, if cut in the direction orthogonal to the length direction thereof, that is a substantial "U" shape. The distal end cover 20 is fitted into the distal end portion of the arm main body 16. The distal end of the distal end cover 20 is open such that the below-described joining holder of the wiper blade 14 can be inserted.

The Wiper Blade 14

As shown in FIG. 1 to FIG. 3, the wiper blade 14 is provided with a blade rubber 34 fabricated of rubber, which is formed substantially in a long, narrow shape. The blade rubber 34 is structured by a base portion 34A disposed at an upper portion side and a wiping portion 34B that is joined to the base portion 34A by a neck portion. The base portion 34A has a substantially rectangular cross-section, and the wiping portion 34B has a substantially triangular cross-section. A lip is formed at a distal end portion (lower end portion) of the wiping portion 34B. The lip wipes a wiped surface S of the windshield glass WG. A backing substantially in a long, narrow plate shape (not shown in the drawings) is disposed at an upper face of the base portion 34A. The backing is constituted by a plate spring member. The base portion 34A and backing of the blade rubber 34 are retained in a state of being covered by a retention case, which is not shown in the drawings. The retention case is formed in a long, narrow shape and a cross-sectional shape thereof is substantially a "C" shape.

The joining holder, which is not shown in the drawings, is disposed at a length direction central portion of the wiper blade 14. The backing is retained in a state in which movement thereof in the length direction is regulated by the joining holder. Thus, the blade rubber 34 and the backing are retained together with the retention case. The clip described above, to which the distal end portion of the arm main body 16 of the wiper arm 12 is joined, is assembled to the joining holder to be turnable about the spindle portion.

The wiper arm 12 described above is pressed to a side at which the wiped surface S of the windshield glass WG is disposed by a pressing mechanism, which is not shown in the drawings. The blade rubber 34 of the wiper blade 14 with the structure described above is subjected to this pressing force and is pressed to touch against the wiped surface S of the windshield glass WG.

FIG. 3 shows the wiping range of the vehicle wiper apparatus 10 equipped with the wiper arms 12 and wiper blades 14 with the structures described above. As is shown in FIG. 3, each wiper blade 14 is disposed to be offset to one side in the turning direction relative to the wiper arm 12 (the side of the direction of the inflection of the arm main body 16 by the lateral inflection portion 28). As described above, the distal end portion of the pivot rod 26 with the substantially circular rod shape is fastened to be fixed to the fixing portion 22 formed at the proximal end side of the wiper arm 12. The pivot rod 26 is turnably supported at a pivot holder (not shown in the drawings), which is fixed to a frame or the like of the vehicle. Each pivot rod 26 is linked to a wiper motor WM (see FIG. 9) via a linking mechanism. The pivot rod 26 is reciprocatingly turned by driving force of the wiper motor WM. Thus, the wiper arm 12 is reciprocatingly turned between a rest position (the position shown by solid lines in FIG. 3) and a turned position (a position shown by a single-dot chain line in FIG. 3). The direction of turning of the wiper arm 12 from the rest position to the turned position (the direction of arrow A in FIG. 3) is referred to as "one turning direction side" (a going motion side of the reciprocating turning), and the direction of turning of the wiper arm 12 from the turned position to the rest position (the direction of arrow B in FIG. 3) is referred to as "the other turning direction side" (a return motion side of the reciprocating turning).

Now, principal portions of the present exemplary embodiment are described.

Layout of Components Accommodated Inside the Wiper Arm 12

As shown in FIG. 1, a first line hose 40 and a second line hose 42 are accommodated, side-by-side in the arm width direction, inside the arm main body 16 of the wiper arm 12 described above. The first line hose 40 and the second line hose 42 are fabricated of rubber. A first nozzle 44 (also referred to as an "intermediate position nozzle" or the like) is disposed at the length direction intermediate position of the arm main body 16. A second nozzle 46 (also referred to as a "distal end side nozzle", a "first distal end side nozzle" or the like) is disposed at the length direction distal end side of the arm main body 16. A third nozzle 48 (also referred to as a "distal end side nozzle", a "second distal end side nozzle", a "lateral inflection side nozzle" or the like) is disposed at the above-described lateral inflection portion 28 of the arm main body 16. These are described in detail below.

—First Line Hose 40 and Second Line Hose 42—

The first line hose 40 is divided into four parts, a proximal end side hose 50, an intermediate upstream side hose 52, an intermediate downstream side hose 54, and a distal end side hose 56.

A distal end portion of the proximal end side hose 50 and a proximal end portion of the intermediate upstream side hose 52 are joined and put into fluid communication with one another via a hose connecting member 58. The hose connecting member 58 is structured as a tubular member, at two end portions in an axial direction of which conical anchoring portions are formed. A penetrating hole that serves as a channel is formed through an axial central portion of the hose connecting member 58. A check valve, which is not shown in the drawings, is incorporated in the penetrating hole that is the channel. This check valve retains washing fluid in the hoses and prevents the washing fluid from leaking out through the nozzles. A distal end portion of the intermediate downstream side hose 54 and a proximal end portion of the distal end side hose 56 are joined and put into fluid communication with one another via a hose connecting member 60 with a similar structure to the hose connecting member 58.

The second line hose 42 is structured by a proximal end side hose 62 and a single main hose 64. The proximal end side hose 62 is disposed in parallel with the proximal end side hose 50 of the first line hose 40 and is set to the same length as the proximal end side hose 50. The main hose 64 is disposed in parallel with the intermediate upstream side hose 52, the intermediate downstream side hose 54 and the distal end side hose 56 of the first line hose 40. In other words, the second line hose 42 is divided into two hoses.

A distal end portion of the proximal end side hose 62 and a proximal end portion of the main hose 64 are joined and put into fluid communication with one another via a hose connecting member 66 with a similar structure to the hose connecting member 58.

—First Nozzle 44 and Second Hose Retention Portion 82—

Figure 5B:
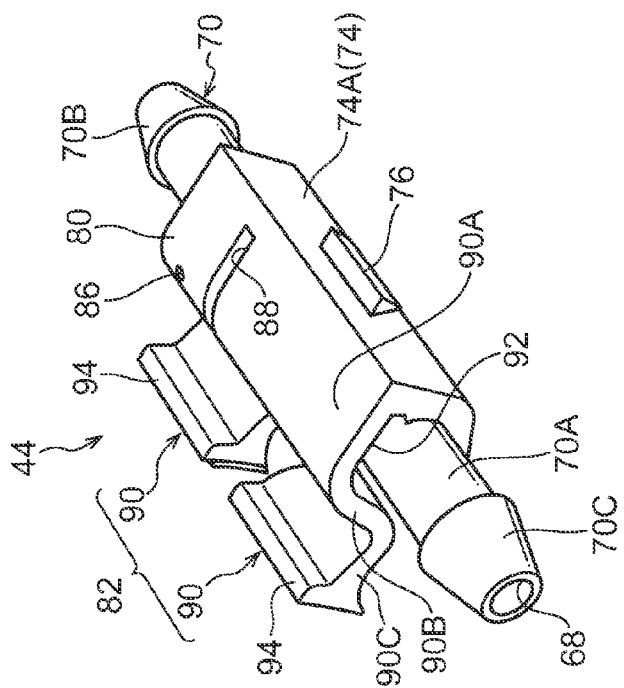
FIG. 5B is a perspective view showing the first nozzle and the hose retention unit shown in FIG. 4 viewed from a different angle.
Figure 5A:
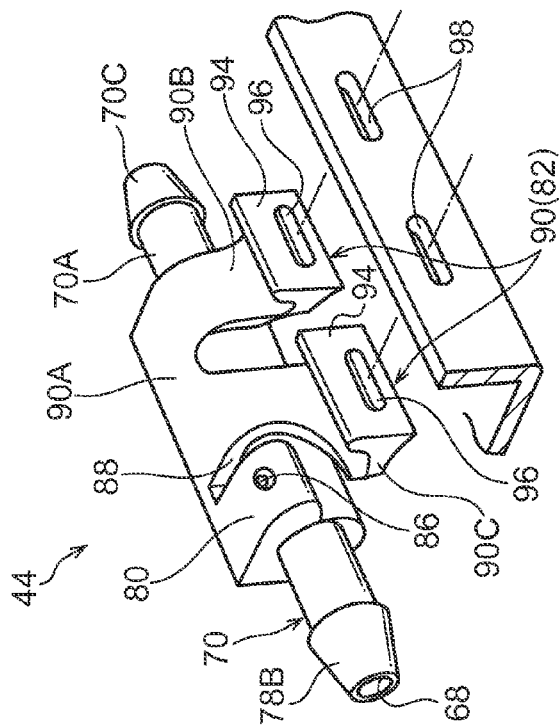
FIG. 5A is a perspective view showing the first nozzle and the hose retention unit shown in FIG. 4 viewed from a different angle.

As shown in FIG. 5A and FIG. 5B, the first nozzle 44 is provided with a first hose retention portion 70 that is formed of a tubular portion 70A, a conical first hose connection portion 70B and a conical second hose connection portion 70C. A penetrating hole 68 that serves as a channel is formed through an axial central portion of the tubular portion 70A. The first hose connection portion 70B is formed at one axial direction end portion of the tubular portion 70A, and the second hose connection portion 70C is formed at the other axial direction end portion of the tubular portion 70A. As shown in FIG. 4, in a state in which the first nozzle 44 has been assembled into the arm main body 16, the first nozzle 44 is disposed such that the first hose connection portion 70B is oriented to the arm proximal end side and the second hose connection portion 70C is oriented to the arm distal end side. A distal end portion of the intermediate upstream side hose 52 of the first line hose 40 is connected to the first hose connection portion 70B, and a proximal end portion of the intermediate downstream side hose 54 of the first line hose 40 is connected to the second hose connection portion 70C.

As shown in FIG. 4, FIG. 5A and FIG. 5B, a support wall 74 is integrally formed at an outer periphery portion of the tubular portion 70A of the first hose retention portion 70. The support wall 74 is formed in a "J" shape as viewed in the axial direction of the tubular portion 70A. In the state in which the first nozzle 44 has been assembled into the arm main body 16, a surface at the arm width direction outer side of the support wall 74 acts as an abutting surface 74A that abuts against an inner side face of the one side wall portion 16A of the arm main body 16. A first engaging portion 76 is integrally formed at a length direction intermediate portion of the abutting surface 74A. The first engaging portion 76 has a right-angled triangular column shape that is long and narrow along the arm length direction. The first engaging portion 76 protrudes to the arm width direction outer side. Correspondingly, a first engaged portion 78 is provided at the inner side surface of the one side wall portion 16A of the arm main body 16, at a location that corresponds with the first engaging portion 76 in the arm width direction. The first engaged portion 78 is a long hole with which the first engaging portion 76 can engage. The first engaged portion 78 is formed in a recess groove shape with a right-angled triangular column shape with which the first engaging portion 76 can engage. Which of the first engaging portion 76 and the first engaged portion 78 protrudes and which is recessed may be reversed, and relationships are possible in which each has recessed and protruding portions that fit with one another. The variant examples and alternative relationships mentioned above similarly apply to second engaging portions 96 and second engaged portions 98, a third engaging portion 124 and a third engaged portion 126, and a fourth engaging portion 134 and a fourth engaged portion 136, which are all described below.

A nozzle portion 80 and a second hose retention portion 82 are integrally formed at an upper end portion of the support wall 74 described above, side-by-side in the axial direction of the tubular portion 70A. The nozzle portion 80 is structured as a portion that projects with a predetermined width from an end portion at the side of the upper end portion of the support wall 74 at which the first hose connection portion 70B is disposed. The nozzle portion 80 projects along the outer periphery portion of the tubular portion 70A in a circular arc surface shape. An intermediate jetting hole 86 is formed at the projection direction distal end side of the nozzle portion 80. Washing fluid 84 (see FIG. 11A and FIG. 11B) is jetted from the intermediate jetting hole 86. The intermediate jetting hole 86 is in fluid communication with the interior of the tubular portion 70A.

The second hose retention portion 82 is spaced apart from the nozzle portion 80 with a slit 88 therebetween. The spacing from the nozzle portion 80 by the slit 88 is intended to prevent the nozzle portion 80 from being affected when a pair of leg portions 90, which are described below, resiliently deform. The second hose retention portion 82 projects from the upper end portion of the support wall 74, in an "S" shape as viewed in the length direction of the tubular portion 70A, so as to cover the tubular portion 70A from above. The second hose retention portion 82 is bifurcated from partway along the projection thereof. Thus, the second hose retention portion 82 is provided with a pair of leg portions 90 that are arranged side-by-side in the axial direction of the tubular portion 70A. A predetermined gap 92 is formed between the pair of leg portions 90, which are an upper portion 90A and an intermediate portion 90B, and the outer periphery portion of the tubular portion 70A. Thus, the pair of leg portions 90 may be resiliently deformed in a direction of being compressed. A rectangular plate-shaped pressing portion 94 is formed at an end portion in a projection direction side of each of lower portions 90C of the leg portions 90. The pressing portions 94 are extended in a direction orthogonal to the lower portions 90C of the leg portions 90 (in a plate thickness direction of the leg portions 90). Each of the second engaging portions 96 is formed integrally with a long, narrow track shape along the length direction of the arm at the middle of each of the pressing portions 94. Correspondingly, the second engaged portions 98 are provided at the inner side surface of the other side wall portion 16B of the arm main body 16. The second engaged portions 98 are formed as long holes with which the second engaging portions 96 can engage, at locations that correspond with the pair of second engaging portions 96 in the arm width direction.

As shown in FIG. 4, in the state in which the first nozzle 44 has been attached into the arm main body 16, a cavity portion 100 is formed at the lower side of the lower portions 90C of the pair of leg portions 90. The cavity portion 100 is for accommodating and retaining the main hose 64 of the second line hose 42. The cavity portion 100 is provided inside the arm main body 16, to the side of the tubular portion 70A. Lower faces of the lower portions 90C of the leg portions 90 come into contact with the main hose 64. Accordingly, these lower faces are formed in recessed curved surface shapes in line with a curved surface shape of the main hose 64. The intermediate portion 90B of the leg portions 90 projects to the side at which the floor face of the arm main body 16 (the rear face of the top wall portion 16C) is disposed, as far as a lower portion side of the tubular portion 70A. It is preferable if the length of the intermediate portion 90B is specified such that a separation distance between the lower end of the intermediate portion 90B and the floor face of the arm main body 16 is equivalent to the external diameter of the main hose 64. Thus, the intermediate portion 90B may be provided with the function of a dividing wall that divides the internal space of the arm main body 16 in two in the arm length direction.

—Second Nozzle 46—

Figure 6:
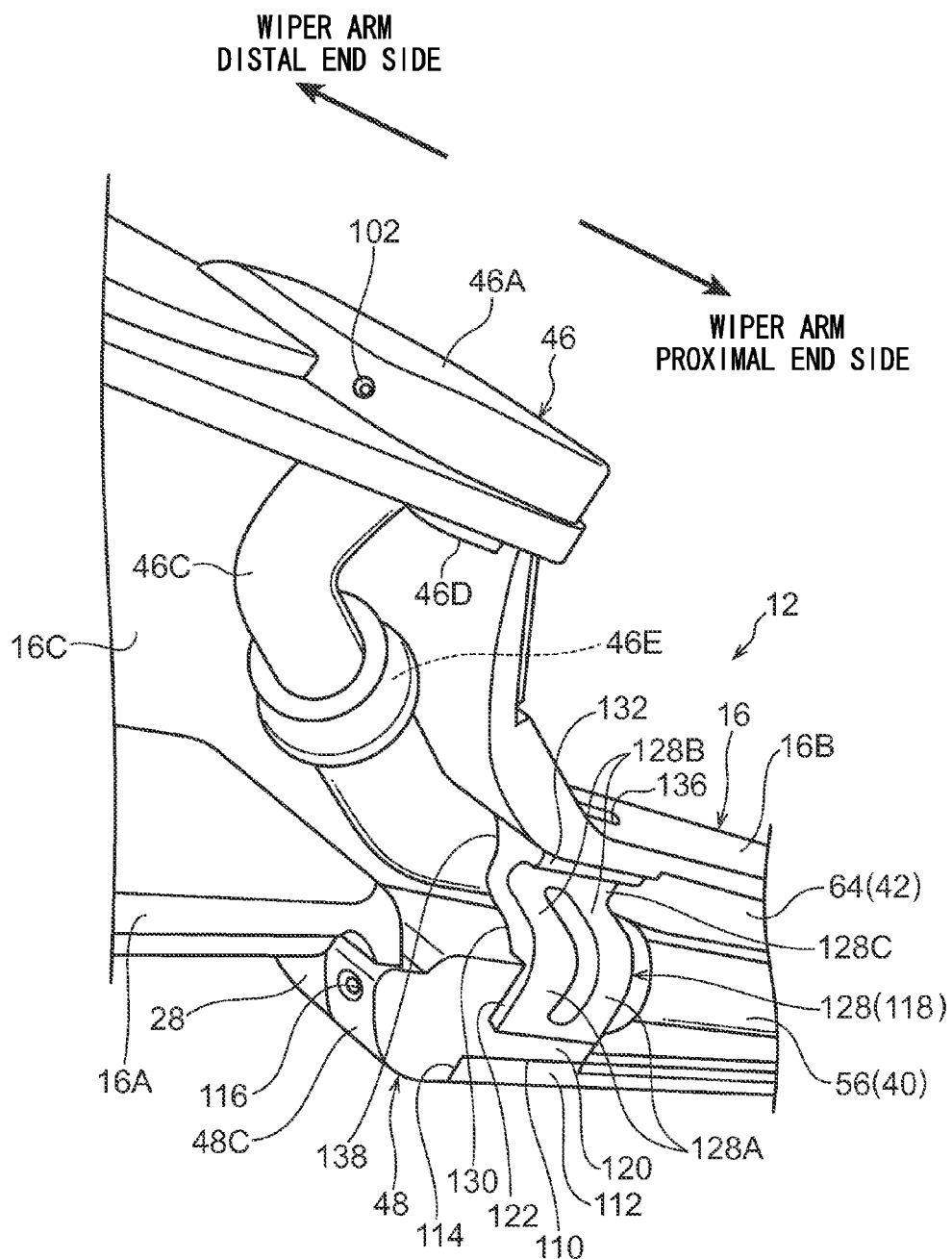
FIG. 6 is a magnified perspective view showing a state of attachment of a second nozzle and a third nozzle that are provided at a distal end side of the wiper arm shown in FIG. 1.
Figure 7:
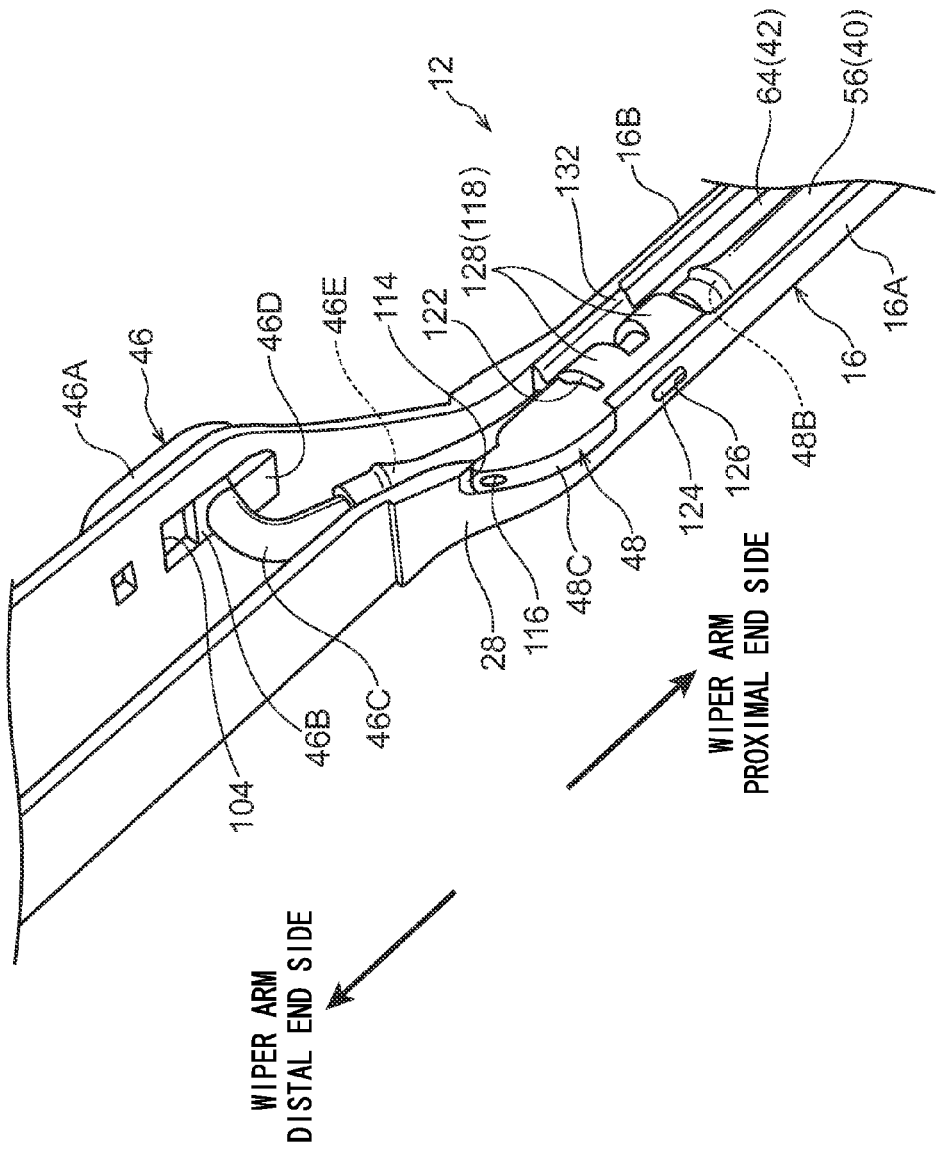
FIG. 7 is a magnified perspective view showing the state of attachment of the second nozzle and third nozzle shown in FIG. 6 viewed from a different angle.

As shown in FIG. 6 and FIG. 7, the second nozzle 46 is structured by a nozzle portion 46A, a small rectangular plate-shaped fitting portion 46B, a tubular portion 46C, a rectangular thin plate-shaped sandwiching portion 46D and a third hose retention portion 46E. The nozzle portion 46A is formed in a substantially rectangular plate shape. The fitting portion 46B is integrally formed at one length direction side of a rear face side of the nozzle portion 46A. The tubular portion 46C protrudes in a substantial "L" shape from a central portion of a rear face of the fitting portion 46B. The sandwiching portion 46D is integrally formed at a base of the tubular portion 46C, at the rear face side of the fitting portion 46B. The third hose retention portion 46E is formed at a distal end portion of the tubular portion 46C.

A first distal end jetting hole 102 is formed at a distal end side in the arm length direction of the nozzle portion 46A, in the vicinity of a corner portion disposed at the side of the nozzle portion 46A at which the windshield glass WG is disposed. The first distal end jetting hole 102 jets the washing fluid 84. The sandwiching portion 46D extends and is protruded from the fitting portion 46B. A rectangular opening portion 104 is formed in the other side wall portion 16B of the arm main body 16. The fitting portion 46B can be tightly fitted into the opening portion 104. An opening width of the opening portion 104 is specified to be slightly greater than a length from a proximal end of the fitting portion 46B to a distal end of the sandwiching portion 46D. The second nozzle 46 is inserted, leading with the third hose retention portion 46E, into the opening portion 104 from the arm outer side thereof. While the third hose retention portion 46E is being pushed further in, the fitting portion 46B tightly fits into the opening portion 104, after which the nozzle portion 46A is slid along in the arm length direction such that a periphery edge portion of the opening portion 104 is sandwiched between the nozzle portion 46A and the sandwiching portion 46D. Thereafter, the distal end portion of the main hose 64 is connected to the third hose retention portion 46E, and thus the second nozzle 46 is attached to the outer side face of the other side wall portion 16B at the distal end side of the arm main body 16.

—Third Nozzle 48 and Distal End Side Second Hose Retention Portion 118—

Figure 8:
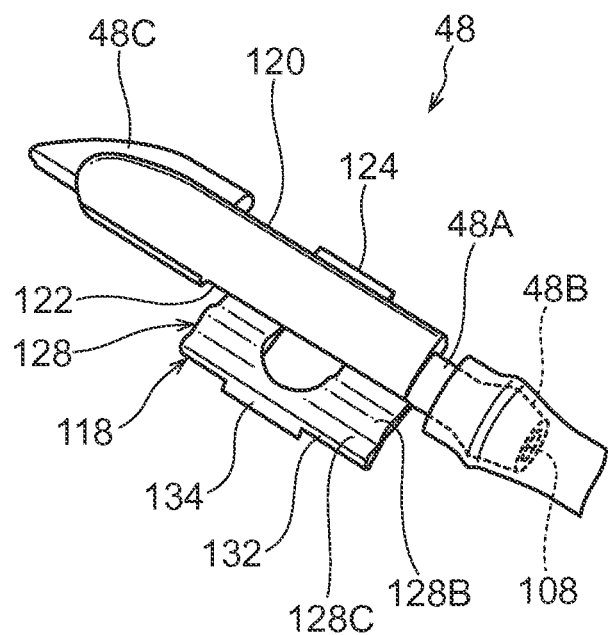
FIG. 8 is a perspective view of a unit of the third nozzle shown in FIG. 6.
Figure 9:
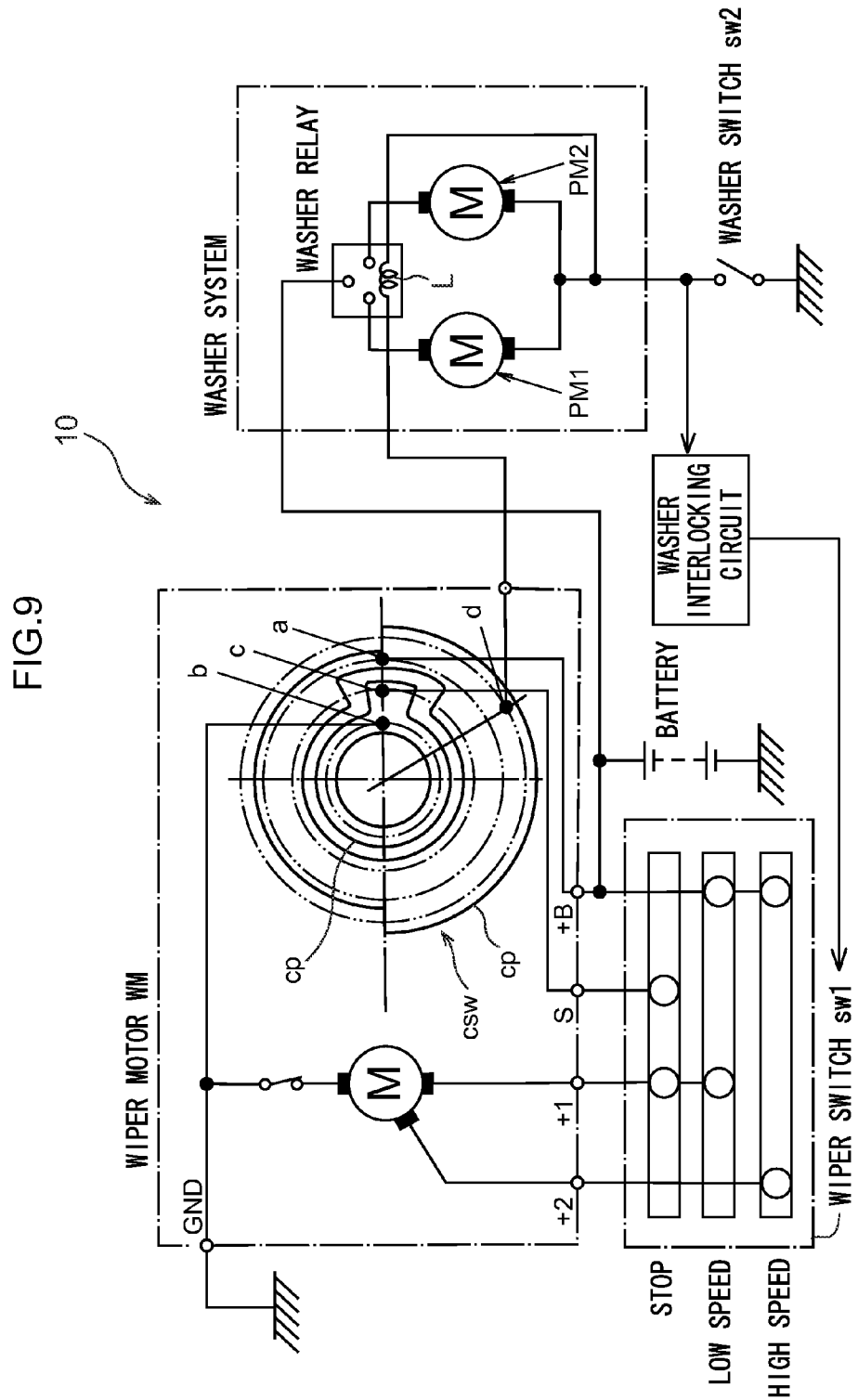
FIG. 9 is a circuit diagram showing electrical structures of the vehicle wiper apparatus shown in FIG. 3.

As shown in FIG. 6 to FIG. 8, the third nozzle 48 is provided with a tubular portion 48A in a substantially tubular shape, a fourth hose retention portion 48B in a conical shape, and a nozzle portion 48C. A penetrating hole 108 that serves as a channel is formed through an axial central portion of the tubular portion 48A, and a distal end portion of the tubular portion 48A is closed off. The fourth hose retention portion 48B serves as a "first hose retention portion", which is formed at one end portion in an axial direction of the tubular portion 48A (an end portion at the side thereof at which the proximal end of the arm main body 16 is disposed). The nozzle portion 48C is formed in a substantial collar shape at the other end portion in the axial direction of the tubular portion 48A. A side of the other end portion in the axial direction of the tubular portion 48A that is opposite to the side thereof at which the nozzle portion 48C is formed serves as a perpendicular surface 110, which is not a circular arc surface and is parallel with the one side wall portion 16A of the arm main body 16. In a state in which the third nozzle 48 has been assembled into the arm main body 16, the third nozzle 48 is disposed such that the fourth hose retention portion 48B is oriented to the arm proximal end side and the nozzle portion 48C is oriented to the arm distal end side. The distal end portion of the intermediate downstream side hose 54 of the first line hose 40 is connected to the fourth hose retention portion 48B.

As mentioned above, the third nozzle 48 is disposed (such that the nozzle portion 48C is disposed) at the lateral inflection portion 28 of the arm main body 16. More precisely, an incision portion 114 is formed in the one side wall portion 16A of the arm main body 16. The incision portion 114 is incised from the upper end of the side wall portion through a range from the arm distal end side of a linear portion 112, which leads to the lateral inflection portion 28, to the proximal end side of the lateral inflection portion 28. The nozzle portion 48C, which is formed in a semicircular collar shape, is tightly fitted into the incision portion 114. An incision depth of the incision portion 114 is substantially the same as a thickness dimension of the nozzle portion 48C. An outer periphery face of the nozzle portion 48C is formed in a shape that duplicates a straight surface and a curved surface so as to match the shape of the one side wall portion 16A of the arm main body 16. A second distal end jetting hole 116, from which the washing fluid 84 is jetted, is formed at the distal end side of the outer periphery face of the nozzle portion 48C. The second distal end jetting hole 116 is in fluid communication with the distal end portion of the tubular portion 48A. An orientation of the second distal end jetting hole 116 formed in the third nozzle 48 (substantially to the other turning direction side relative to the arm main body) and orientations of the intermediate jetting hole 86 formed in the first nozzle 44 and the first distal end jetting hole 102 formed in the second nozzle 46 (substantially to the one turning direction side relative to the arm main body) are specified to be mutually opposite directions with respect to the arm main body 16. However, because of the lateral inflection portion 28, the wiper blade 14 is disposed at one direction side in the arm width direction relative to the arm main body 16. Thus, even though the orientations of the intermediate jetting hole 86 and the second distal end jetting hole 116 are in mutually opposite directions with respect to the arm main body 16, the washing fluid 84 ejected from the two jetting holes 86 and 116 makes impact on the same side (the other turning direction side) relative to the wiper blade 14 (see FIG. 11B). That is, impact positions of the washing fluid from the first and third nozzles to which the washing fluid 84 is supplied by the first line hose 40 are at the same side relative to the wiper blade 14 (the other turning direction side).

A distal end side second hose retention portion 118 with a similar structure to the second hose retention portion 82 described above is integrally formed at the third nozzle 48. Described more specifically, a support wall 120 is integrally formed, at the same direction side as the nozzle portion 48C, at an outer periphery portion of an axial direction intermediate portion of the tubular portion 48A (broadly speaking, a region excluding a range in which the fourth hose retention portion 48B and the nozzle portion 48C are formed). The distal end side second hose retention portion 118 is disposed apart from the nozzle portion 48C with a slit 122 therebetween. The spacing from the nozzle portion 48C by the slit 122 is intended to prevent the nozzle portion 48C from being affected when a pair of leg portions 128, which are described below, resiliently deform. In the state in which the third nozzle 48 has been assembled into the arm main body 16, the perpendicular surface 110 at the arm width direction outer side of the support wall 120 serves as an abutting surface that abuts against the inner side surface of the one side wall portion 16A of the arm main body 16. The third engaging portion 124 is integrally formed at a length direction intermediate portion of the perpendicular surface 110. The third engaging portion 124 has a right-angled triangular column shape that is long and narrow along the arm length direction. The third engaging portion 124 protrudes to the arm width direction outer side. Correspondingly, the third engaged portion 126 is provided at the inner side surface of the one side wall portion 16A of the arm main body 16, at a location that corresponds with the third engaging portion 124 in the arm width direction. The third engaged portion 126 is a long hole with which the third engaging portion 124 can engage.

The distal end side second hose retention portion 118 is integrally formed at an upper end portion of the support wall 120 described above. The distal end side second hose retention portion 118 is projected from the upper end portion of the support wall 120, in an "S" shape as viewed in the length direction of the tubular portion 48A, so as to cover the tubular portion 48A from above. The distal end side second hose retention portion 118 is bifurcated from partway along the projection thereof, being provided with a pair of leg portions 128 that are arranged side-by-side in the axial direction of the tubular portion 48A. An upper portion 128A of the pair of leg portions 128 is integrated with an outer periphery portion of the tubular portion 48A, and a predetermined gap 130 is formed between an intermediate portion 128B of the pair of leg portions 128 and the outer periphery portion of the tubular portion 48A. Thus, the pair of leg portions 128 is resiliently deformable in a direction in which the intermediate portion 128B approaches the tubular portion 48A. A predetermined gap may also be formed between the upper portion 128A and the tubular portion 48A as well as between the intermediate portion 128B and the tubular portion 48A. A rectangular plate-shaped pressing portion 132 is formed at end portions in a projection direction side of lower portions 128C of the leg portions 128. The pair of leg portions 128 is connected by the pressing portion 132. The pressing portion 132 is extended in a direction orthogonal to the lower portions 128C of the leg portions 128 (in a plate thickness direction of the leg portions 128). The fourth engaging portion 134 is formed integrally with a long, narrow track shape along the arm length direction at the middle of the pressing portion 132. Correspondingly, the fourth engaged portion 136 is provided at the inner side surface of the other side wall portion 16B of the arm main body 16. The fourth engaged portion 136 is formed as a long hole with which the fourth engaging portion 134 can engage, at a location that corresponds with the fourth engaging portion 134 in the arm width direction.

In the state in which the third nozzle 48 has been attached into the arm main body 16, a cavity portion 138 is formed at the lower side of the lower portions 128C of the pair of leg portions 128. The cavity portion 138 is for accommodating and retaining the main hose 64 of the second line hose 42. The cavity portion 138 is provided inside the arm main body 16, to the side of the tubular portion 48A. Lower faces of the lower portions 128C of the leg portions 128 come into contact with the main hose 64. Accordingly, these lower faces are formed in recessed curved surface shapes in line with the curved surface shape of the main hose 64.

The proximal end side hose 50 of the first line hose 40 described above and the proximal end side hose 62 of the second line hose 42 are connected via a joint member 140 (see FIG. 2) to, respectively, a second washer pump and a first washer pump, which are not shown in the drawings. The first washer pump is connected with a washer tank, which is not shown in the drawings, and the first washer pump is structured so as to supply the washing fluid 84 when a first washer pump motor PM1 (see FIG. 9) is being driven. Similarly, the second washer pump is connected with the washer tank that is not shown in the drawings, and the second washer pump is structured so as to supply the washing fluid 84 when a second washer pump motor PM2 (see FIG. 9) is being driven.

—Electrical Structures of the Vehicle Wiper Apparatus 10—

Now, electrical structures of the vehicle wiper apparatus 10 that is structured as described above are described using FIG. 9.

The vehicle wiper apparatus 10 is equipped with a wiper switch sw1 and a wiper motor WM. When the wiper switch sw1 is turned on, the wiper motor WM is driven, such that the pivot rods 26 turn. The wiper switch sw1 includes a "+B terminal", an "S terminal", a "+1 terminal" and a "+2 terminal". The +B terminal is connected to the vehicle's battery.

The wiper motor WM features a high-speed brush, a low-speed brush, and a common brush that can be used for both low speed and high speed. Thus, the wiper motor WM is capable of operating in a high-speed mode in which the vehicle wiper apparatus 10 is operated at a high speed and a low-speed mode in which the vehicle wiper apparatus 10 is operated at a low speed. A positive terminal that is connected to the low-speed brush of the wiper motor WM is connected to the +1 terminal of the wiper switch sw1, and a positive terminal that is connected to the high-speed brush of the wiper motor WM is connected to the +2 terminal of the wiper switch sw1. A negative terminal that is connected to the common brush of the wiper motor WM is connected to ground GND.

A cam switch csw is provided at the wiper motor WM. The cam switch csw corresponds with wiping positions of the wiper blades 14. The structure is such that even if the wiper switch sw1 is turned off in a state in which each wiper blade 14 is disposed elsewhere than at the rest position, the wiper blade 14 is returned to the rest position by the cam switch csw.

The cam switch "csw" includes an "a contact", a "b contact", a "c contact", a "d contact" and a cam plate cp. The "a contact" is connected to the +B terminal of the wiper switch sw1, and the "b contact" is connected to ground GND together with the negative terminal of the wiper motor WM. The "c contact" is connected to the S terminal of the wiper switch sw1, and the "d contact" is connected to a coil L of a relay of a washer system, which is described below.

The cam plate "cp" is structured so as to turn integrally with a worm wheel (not shown in the drawings) that is joined to an output shaft of the wiper motor WM, such that the cam plate "cp" turns through one rotation when the wiper blade 14 reciprocates through one cycle between the rest position and the turned position. FIG. 3 shows the state in which each wiper blade 14 is disposed at the rest position. When the wiper motor WM is driven, the cam plate "cp" turns and the c contact is connected with one or other of the b contact or the a contact by the cam plate cp. Specifically, when the wiper blade 14 is elsewhere than at the rest position, the "c contact" is connected with the "a contact". Thus, even when the wiper switch sw1 is turned off while the wiper blade 14 is elsewhere than at the rest position, driving current is supplied to the wiper motor WM via the cam switch csw. When the wiper blade 14 has turned to the rest position, the c contact is connected to the b contact. Accordingly, the low-speed brush and the common brush of the wiper motor WM form a closed circuit with the ground potential GND, and the wiper motor WM is stopped at the rest position.

The vehicle wiper apparatus 10 is also equipped with the washer system. The washer system includes the first washer pump motor PM1 that drives the first washer pump and the second washer pump motor PM2 that drives the second washer pump. One end of each of the first washer pump motor PM1 and the second washer pump motor PM2 is connected to ground GND via a washer switch sw2. One or other of the other ends of the first washer pump motor PM1 and the second washer pump motor PM2 is connected to the vehicle's battery by a switching contact of the washer relay.

The wiper switch sw1 is connected, via a washer interlocking circuit, to between the washer switch sw2 and the first washer pump motor PM 1 and second washer pump motor PM2. Thus, when the washer switch sw2 is turned on, the wiper is operated by a wiper relay in the washer interlocking circuit.

The coil L of the washer relay of the washer system operates and selectively supplies current to one or other of the first washer pump motor PM1 and the second washer pump motor PM2 in accordance with whether or not the d contact is connected by the cam plate cp. Herein, the cam plate "cp", the coil L, the first washer pump motor PM1 and the second washer pump motor PM2 correspond to a "switching mechanism" of the present invention.

More specifically, as shown in the timing chart in FIG. 10, when the washer switch sw2 is turned on in a state in which the ignition switch (IG SW) of the vehicle has been turned on, the first washer pump motor PM1 is turned on by the washer relay. Hence, the wiper motor WM is turned on by the wiper relay in the washer interlocking circuit, and the wiper blade 14 is turned from the rest position to the turned position (the going motion). In FIG. 10, the state in which the wiper blade 14 is turning to the one turning direction side (the going motion) is labelled "OPEN", and the state in which the wiper blade 14 is turning to the other turning direction side (the return motion) is labelled "CLOSE".

The washer relay is specified so as to switch from driving the first washer pump motor PM1 to driving the second washer pump motor PM2 at a position before the wiper blade 14 reaches the turned position (the position of switching from OPEN to CLOSE). Herebelow, this switching position is referred to as an "upper switching position". The position of the wiper blade 14 at this time corresponds to a position shown by a single-dot chain line in FIG. 3 (see FIG. 3).

When the wiper blade 14 is turning from the turned position toward the rest position (the return motion), the washer relay is further specified so as to switch from driving the second washer pump motor PM2 to driving the first washer pump motor PM1 at a position before the wiper blade 14 reaches the rest position (the position of switching from CLOSE to OPEN). Herebelow, this switching position is referred to as a "lower switching position". The position of the wiper blade 14 at this time corresponds to a position shown by a single-dot chain line in FIG. 3.

That is, a structure is formed such that, as shown in FIG. 11A, the wiper arm 12 is turned to the one turning direction side and the washing fluid 84 is supplied via the second line hose 42 and through the second nozzle 46 until the upper switching position is reached. Then, at the upper switching position just before the turned position, driving is switched from driving of the first washer pump motor PM1 to driving of the second washer pump motor PM2, and the washing fluid 84 is supplied via the first line hose 40 and through the first nozzle 44 and the third nozzle 48.

Conversely, as shown in FIG. 11B, the wiper arm 12 is turned to the other turning direction side from the turned position and the washing fluid 84 is supplied via the first line hose 40 and through the first nozzle 44 and the third nozzle 48 until the lower switching position is reached. Then, at the lower switching position just before the rest position, driving is switched from driving of the second washer pump motor PM2 to driving of the first washer pump motor PM1, and the washing fluid 84 is supplied via the second line hose 42 and through the second nozzle 46.

The region between the upper switching position and the lower switching position is referred to as a central wiping region CA (see FIG. 3). A central position of the central wiping region CA in the turning direction (a position that is separated by equal distances from the rest position and the turned position) is referred to as a turning direction central position CL (see FIG. 3).

Next, operation and effects of the present exemplary embodiment are described.

In the vehicle wiper apparatus 10 structured as described above, the washer switch sw2 is turned on when the washing fluid 84 is to be supplied to the wiped surface S of the windshield glass WG and the wiped surface S is to be wiped by the wiper blade 14. When the washer switch sw2 is turned on, the wiper motor WM linked with the washer switch sw2 is operated for a predetermined duration, and the wiper blade 14 is turned together with the wiper arm 12 to the one turning direction side from the rest position at a low speed. At this time, the first washer pump motor PM 1 is driven and the washing fluid 84 is supplied through the second nozzle 46 to the one turning direction side (the wiping direction forward side) relative to the wiper blade 14. At the upper switching position, the driving is switched from driving of the first washer pump motor PM1 to driving of the second washer pump motor PM2, and the washing fluid 84 is supplied through the first nozzle 44 and the third nozzle 48.

The wiper blade 14 continues to turn to the one turning direction side from the upper switching position, and at the turned position the wiper blade 14 turns back and turns to the other turning direction side. At this time, the washing fluid 84 is being supplied through the first nozzle 44 and the third nozzle 48 to the other turning direction side (the wiping direction forward side) relative to the wiper blade 14. At the lower switching position, the driving is switched from driving of the second washer pump motor PM2 to driving of the first washer pump motor PM1, and the washing fluid 84 is supplied through the second nozzle 46.

The wiper blade 14 continues to turn to the other turning direction side from the lower switching position, and at the rest position the wiper blade 14 turns back and turns to the one turning direction side. Thereafter, the reciprocating motion of the wiper blade 14 is repeated for a specified number of cycles.

Now, in the wiper arm 12 according to the present exemplary embodiment, the cross-sectional shape of the arm main body 16 of the wiper arm 12 if cut in the direction orthogonal to the arm length direction is the "U" shape, and the two-line hose, the first line hose 40 connected to the first nozzle 44 (and the third nozzle 48) and the second line hose 42 connected to the second nozzle 46, are accommodated side-by-side within the arm main body 16. When the washing fluid 84 is supplied to the first line hose 40, the washing fluid 84 is jetted from the intermediate jetting hole 86 of the first nozzle 44 (and the second distal end jetting hole 116 of the third nozzle 48). When the washing fluid 84 is supplied to the second line hose 42, the washing fluid 84 is jetted from the first distal end jetting hole 102 of the second nozzle 46. Thus, in the wiper arm 12 according to the present exemplary embodiment, the two-line hose may be used to jet the washing fluid 84 respectively and distinctly differently from the first nozzle 44 and the second nozzle 46 provided at two locations. Thus, compared with a case in which washing fluid is jetted from nozzles provided at two locations on a single-line hose, excellent wiping performance can be obtained.

In the present exemplary embodiment, the first nozzle 44 is attached to the arm main body 16, the first line hose 40 is retained by the first hose retention portion 70 provided at the first nozzle 44, and the second line hose 42 is retained by the distal end side second hose retention portion 118 provided at the third nozzle 48. Thus, the hose retention portions are provided one for each hose. Therefore, a stable state of arrangement may be maintained without the state of arrangement of the first line hose 40 and the second line hose 42 being complicated or the like by the angular motions of the wiper arm 12. In addition, because the second hose retention portion 82 retaining the second line hose 42 is provided at the first nozzle 44 and is provided integrally with the first hose retention portion 70, that retains the first line hose 40, the number of components may be reduced compared to a structure in which hose retention portions are provided separately for each hose.

Furthermore, in the wiper arm 12 according to the present exemplary embodiment, the first nozzle 44 is disposed at the intermediate position in the length direction of the arm main body 16 and the second nozzle 46 is disposed at the distal end side of the arm main body 16. Therefore, the washing fluid 84 is jetted from two locations at the intermediate position and the distal end side of the length direction of the wiper arm 12 by the first nozzle 44 and the second nozzle 46 that are connected to hoses of separate lines. Thus, in a vehicle that is equipped with the vehicle wiper apparatus 10 employing the wiper arms 12, the washing fluid 84 is plentifully supplied even to the length direction proximal end side of each wiper blade 14. Moreover, the washing fluid 84 impacting at the length direction proximal end side of the wiper blade 14 is spread widely in the length direction of the wiper arm 12 by the wind of travel. Therefore, the washing fluid 84 spreads in the length direction of the wiper blade 14 and wiping performance is improved.

In the wiper arm 12 according to the present exemplary embodiment, because the nozzle portion 80 is integrally provided at the first hose retention portion 70 that is a portion of the hose retention unit, the function of a nozzle and the function of retaining two hoses may be combined in a single component (the first nozzle 44). This contributes to a reduction in the number of components and helps to reduce costs.

According to the wiper arm 12 in accordance with the present exemplary embodiment, because the first line hose 40 is connected to the first hose retention portion 70, the first line hose 40 is firmly retained within the arm main body 16. Meanwhile, the second hose retention portion 82 is projected from the first hose retention portion 70 and forms the cavity portion 100 between the second hose retention portion 82 and the inner wall surface of the arm main body 16. Because the second line hose 42 is arranged in this cavity portion 100, the second line hose 42 is retained (separately from the first line hose 40) within the arm main body 16. Therefore, the second line hose 42 may move to some extent within the cavity portion 100 (for example, in the length direction of the second line hose 42). Hence, the second nozzle 46 is less likely to be subjected to loads, the attitude of the second nozzle 46 is stable, and an impact point of the washing fluid 84 jetted from the first distal end jetting hole 102 is unlikely to be displaced. These effects are similarly provided at the third nozzle 48 that has a similar hose retention structure to the first nozzle 44.

In the wiper arm 12 according to the present exemplary embodiment, the first engaging portion 76, which is engaged with the first engaged portion 78 formed at the one side wall portion 16A of the arm main body 16, is formed at the arm width direction outer side of the first nozzle 44, and the second engaging portion 96, which is engaged with the second engaged portion 98 formed at the other side wall portion 16B of the arm main body 16, is formed at the arm width direction outer side of the second hose retention portion 82. In addition, the second hose retention portion 82 is constituted to be resiliently deformable in the projection direction thereof. Therefore, for example, the first nozzle 44 can be assembled to the intermediate position of the arm main body 16 as described following. Firstly, the first engaging portion 76 is engaged with the first engaged portion 78 formed in the one side wall portion 16A at the intermediate position of the arm main body 16. Then, while the second hose retention portion 82 is being resiliently deformed (compressed) in the projection direction thereof, the second engaging portion 96 is engaged with the second engaged portion 98 formed at the other side wall portion 16B of the arm main body 16. Hence, the second hose retention portion 82 is resiliently restored, and this resilient restoring force acts as a force causing the second engaging portion 96 to engage with the second engaged portion 98. Thus, according to the present exemplary embodiment, the first nozzle 44 may be attached into the arm main body 16 by a one-touch operation. In addition, after the first nozzle 44 has been attached to the arm main body 16, unintended detachment of the first nozzle 44 from the arm main body 16 is prevented, The unintended detachment of the first nozzle 44 may be caused due to vibrations of the vehicle, pulsing during washing fluid supply or the like. These effects are similarly provided at the third nozzle 48 that has a similar fixing structure to the first nozzle 44.

In the wiper arm 12 according to the present exemplary embodiment, the second nozzle 46 and third nozzle 48 with mutually different jetting directions of the washing fluid 84 are disposed at the length direction distal end side of the hose arm main body 16, and the third nozzle 48 and the first nozzle 44 are in fluid communication with one another through the intermediate downstream side hose 54 and distal end side hose 56 that form the same line as the intermediate upstream side hose 52. Therefore, when the washing fluid 84 is supplied to the first line hose 40, the washing fluid 84 is jetted from two locations, the first nozzle 44 and the third nozzle 48. When the washing fluid 84 is supplied to the second line hose 42, the washing fluid 84 is jetted from the second nozzle 46. Thus, in the present exemplary embodiment, the washing fluid 84 is jetted from a total of three locations by the two-line hose, one location that is intermediate in the length direction of the arm main body 16 and two locations that are at the distal end. Accordingly, if the washing fluid 84 is jetted only when the arm main body 16 is turning in one or other direction during the reciprocating motions, for example, the washing fluid 84 is jetted from the first nozzle 44 and the third nozzle 48 only during the return motion of the wiper arm 12 and larger amounts of the washing fluid 84 are jetted, then when the wiper blade 14 is at an intermediate wiping position (the length direction of the wiper blade 14 is disposed in a vehicle front-and-rear direction), the washing fluid 84 may be jetted at the proximal end side of the wiper blade 14 and the washing fluid 84 may be widely spread along the length direction of the wiper arm 12 by the wind of travel. Therefore, the washing fluid 84 may be jetted efficiently. Thus, an amount of the washing fluid 84 being used may be reduced.

In the wiper arm 12 according to the present exemplary embodiment, the lateral inflection portion 28 that is inflected to the arm width direction one side is formed at the length direction distal end side of the arm main body 16, and the third nozzle 48 is disposed at the one side wall portion 16A that is disposed at the arm width direction other side of the lateral inflection portion 28. Therefore, the washing fluid 84 may easily be jetted directly in front of the wiper blade 14 without being obstructed by the wiper blade 14. As a result, the jetted washing fluid 84 may be wiped by the wiper blade 14 promptly, and obstruction of a driver's field of vision by the impacted washing fluid 84 may be prevented.

In the wiper arm 12 according to the present exemplary embodiment, the wiper blade 14 is disposed at the arm width direction one side relative to the arm main body 16 due to the lateral inflection portion 28 at the length direction distal end side of the arm main body 16, and the orientations of the intermediate jetting hole 86 of the first nozzle 44 and the second distal end jetting hole 116 of the third nozzle 48 are specified so as to jet the washing fluid 84 in mutually opposite directions with respect to the arm main body 16. Therefore, the washing fluid 84 that is supplied to the first line hose 40 may be continuously jetted in mutually opposite directions with respect to the arm main body 16, but the washing fluid 84 jetted from the intermediate jetting hole 86 of the first nozzle 44 and the washing fluid 84 jetted from the second distal end jetting hole 116 of the third nozzle 48 may impact at the same side with respect to the wiper blade 14.

As described hereabove, according to the vehicle wiper apparatus 10 equipped with the wiper arm 12 according to the present exemplary embodiment, a stable state of arrangement of hoses may be maintained when a two-line hose, the first line hose 40 and the second line hose 42, is arranged in the arm main body 16, in addition to which an increase in the number of components may be suppressed.

Further, the vehicle wiper apparatus 10 according to the present exemplary embodiment includes a switching mechanism that selectively switches the supply of the washing fluid 84 to the first line hose 40 or the second line hose 42 such that the washing fluid 84 is jetted to the wiping direction forward side of the wiper blade 14. Consequently, because the washing fluid 84 is promptly wiped by the wiper blade 14, cases of the washing fluid 84 staying in place for a relatively long time before being wiped can be prevented.

—Supplementary Descriptions of the Above Exemplary Embodiment—

(1) Supplementary descriptions of correspondences between the structural elements of the present exemplary embodiment and the structural elements of the present invention are given below.

The "hose retention unit" of the present invention is employed at both the first nozzle 44 and the third nozzle 48. At the first nozzle 44, the first hose retention portion 70 and the second hose retention portion 82 correspond to the hose retention unit of the present invention, and at the third nozzle 48, the fourth hose retention portion 48B and the distal end side second hose retention portion 118 correspond to the hose retention unit of the present invention. The fourth hose retention portion 48B of the third nozzle 48 also corresponds to the first hose retention portion of the present invention. Although two locations of the wiper arm 12 in the present exemplary embodiment, the first nozzle 44 and the third nozzle 48, are specified as hose retention units, this is not limiting: one of the two may be specified, or three or more locations may be specified.

(2) In the present exemplary embodiment as described above, the arm main body 16 is formed in a U shape in cross-section over the whole length in the length direction thereof. However, the present invention encompasses modes in which a portion in the length direction (for example, a distal end portion) of the arm main body is not formed in a U shape in cross-section. The recitation "cross-sectional shape . . . is a U shape" of the present invention encompasses both modes in which the cross-sectional shape is a U shape and in which the cross-sectional shape is a substantial U shape.

(3) In the present exemplary embodiment as described above, taking the first nozzle 44 as an example, the nozzle portion 80 is integrally provided at the hose retention unit that is provided with the first hose retention portion 70 and the second hose retention portion 82, but this is not limiting. A nozzle portion may be provided separately and apart from a hose retention unit. The recitation "the first nozzle portion is provided integrally with the hose retention unit" of the present invention encompasses both modes in which the first nozzle portion is formed integrally with the hose retention unit and in which the first nozzle portion is formed as a separate body from the hose retention unit and is attached to the hose retention unit by adhesive, screws, a fitting structure or the like.

(4) In the present exemplary embodiment as described above, a structure is employed in which the first nozzle 44 and the third nozzle 48 are connected to the first line hose 40, but this is not limiting. The length of the first line hose may be set to the same length as the second line hose and a nozzle disposed only at the distal end side of the first line hose, or a nozzle may be disposed only at the intermediate position of the first line hose 40. That is, provided two line hoses are arranged within the arm main body, the presence of divisions and the number of divisions in each line of hose may be suitably specified in consideration of productivity and the like.

(5) In the present exemplary embodiment as described above, a structure is employed in which jet switching control of the washing fluid 84 is applied at the upper switching position just before the turned position and at the lower switching position just before the rest position, but this is not limiting. The present invention is also applicable to a vehicle wiper apparatus in which this jet switching control is not applied.

The present exemplary embodiment and variations thereof are described above. A wiper arm according to the present invention includes: an arm main body; a first nozzle portion that is disposed at a first predetermined position in the length direction of the arm main body, and that is provided with a jetting hole for washing fluid; a second nozzle portion that is disposed at a second predetermined position in the length direction of the arm main body, and that is provided with a jetting hole that jets washing fluid toward a position that is different from an impact point of the washing fluid jetted from the jetting hole of the first nozzle portion; a first line hose that is accommodated in the arm main body and that is connected to the first nozzle portion; a second line hose that is accommodated in the arm main body side-by-side with the first line hose and that is connected to the second nozzle portion; and a hose retention unit that is attached to the arm main body and that includes a first hose retention portion that retains the first line hose and a second hose retention portion that is provided integrally with the first hose retention portion and retains the second line hose.

In the wiper arm according to the present invention, the first nozzle portion is disposed at an intermediate position of the length direction of the arm main body, and the second nozzle portion is disposed at a distal end side of the arm main body.

According to the wiper arm with the structure described above, the washing fluid is jetted from two locations, at the intermediate position and the distal end side of the length direction of the wiper arm, by the first nozzle portion and second nozzle portion connected to the separate lines of the hose. Therefore, in a vehicle that is equipped with a vehicle wiper apparatus employing this wiper arm, the washing fluid is plentifully supplied to the length direction proximal end side of a wiper blade. In addition, the washing fluid impacting at the length direction proximal end side of the wiper blade is spread widely in the length direction of the wiper arm by the wind of travel. Therefore, the washing fluid is supplied in the length direction of the wiper blade and wiping performance is improved.

In the wiper arm according to the present invention, the first nozzle portion is provided integrally with the hose retention unit.

According to the wiper arm with the structure described above, because the first nozzle portion is provided integrally with the hose retention unit, the function of the nozzle and the function of retaining the two hoses may be combined in a single component. This contributes to a reduction in the number of components and helps to reduce costs.

In the wiper arm according to the present invention, the first nozzle portion includes the hose retention unit that includes the first hose retention portion and the second hose retention portion.

According to the wiper arm with the structure described above, because the first nozzle portion includes the hose retention unit that is provided with the first hose retention portion and the second hose retention portion, the function of the nozzle and the function of retaining the two hoses may be combined in a single component. This contributes to a reduction in the number of components and helps to reduce costs.

In the wiper arm according to the present invention, the first hose retention portion retains the first line hose in the arm main body due to the first line hose being connected to the first hose retention portion, and the second hose retention portion is projected from the first retention portion and forms a cavity portion between the second hose retention portion and an inner wall surface of the arm main body, and the second hose retention portion retains the second line hose in the arm main body due to the second line hose being arranged in the cavity portion.

According to the wiper arm with the structure described above, because the first line hose is connected to the first hose retention portion, the first line hose is firmly retained within the arm main body. Meanwhile, the second hose retention portion is projected from the first hose retention portion and forms the cavity portion between the second hose retention portion and the inner wall surface of the arm main body. Because the second line hose is arranged in this cavity portion, the second line hose is retained separately from the first line hose within the arm main body. Consequently, the second line hose may move to some extent (for example, in the length direction of the second line hose) within the cavity portion. Therefore, the second nozzle portion is less likely to be subjected to loads, the attitude of the second nozzle portion is stable, and an impact point of washing fluid jetted from the jetting hole thereof is unlikely to be displaced.

In the wiper arm according to the present invention, a first engaging portion is formed at an outer side in the arm width direction of the first hose retention portion, the first engaging portion engaging with a first engaged portion formed at a side wall portion at one side of the arm main body, a second engaging portion is formed at an outer side in the arm width direction of the second hose retention portion, the second engaging portion engaging with a second engaged portion formed at a side wall portion at another side of the arm main body, and the second hose retention portion is constituted to be resiliently deformable along the projection direction thereof.

According to the wiper arm with the structure described above, the hose retention unit can be assembled to the intermediate position of the arm main body, for example, as described following. Firstly, the first engaging portion formed at the first hose retention portion is engaged with the first engaged portion formed at the wall portion of one side at the intermediate position of the arm main body. Then, while the second hose retention portion is being resiliently deformed along the projection direction thereof, the second engaging portion formed at the second hose retention portion is engaged with the second engaged portion formed at the wall portion at the other side of the arm main body. Hence, the second hose retention portion is resiliently restored, and this resilient restoring force acts as a force causing the second engaging portion to engage with the second engaged portion. Thus, according to the present invention, the hose retention unit may be attached into the arm main body by a one-touch operation. In addition, after the hose retention unit has been attached to the arm main body, unintended detachment of the hose retention unit from the arm main body, due to vibrations of the vehicle, pulsing during washing fluid supply or the like, is prevented.

In the wiper arm according to the present invention, a third nozzle portion is disposed at the distal end side of the length direction of the arm main body relative to the first nozzle portion, the third nozzle portion including a jetting hole that jets washing fluid toward a position that is different from an impact point of the washing fluid jetted from the jetting hole of the second nozzle portion, and the third nozzle portion and the first nozzle portion are in fluid communication with one another through the first line hose.

According to the wiper arm with the structure described above, the second nozzle portion and third nozzle portion with mutually different jetting directions of the washing fluid are disposed at the length direction distal end side of the arm main body, and the third nozzle portion and the first nozzle portion are in fluid communication with one another through the first line hose. Therefore, when the washing fluid is supplied to the first line hose, the washing fluid is jetted from two locations, the first nozzle portion and the third nozzle portion. When the washing fluid is supplied to the second line hose, the washing fluid is jetted from the second nozzle portion. Thus, in the present invention, the washing fluid is jetted from a total of three locations by the two-line hose, one location that is intermediate in the length direction of the arm main body and two locations that are at the distal end of the arm main body. Accordingly, if the washing fluid is jetted only when the wiper arm is turning in one or other direction during the reciprocating motions, for example, the washing fluid is jetted from the first nozzle portion and the third nozzle portion only during the return motion of the wiper arm such that larger amounts of the washing fluid are jetted, then when the wiper blade is at an intermediate wiping position (the length direction of the wiper blade is disposed in a vehicle front-and-rear direction), the washing fluid may be jetted at the proximal end side of the wiper blade and the washing fluid may be widely spread along the length direction of the wiper arm by the wind of travel. Therefore, the washing fluid may be jetted efficiently. Thus, an amount of the washing fluid being used may be reduced.

In the wiper arm according to the present invention, a lateral inflection portion is formed at the distal end side of the length direction of the arm main body, the lateral inflection portion inflecting to one side in the arm width direction, and the third nozzle portion is disposed at a side wall portion that is disposed at the other side in the arm width direction of the lateral inflection portion.

According to the wiper arm with the structure described above, the lateral inflection portion that is inflected to the one side in the arm width direction is formed at the length direction distal end side of the arm main body, and the third nozzle portion is disposed at the side wall portion of the arm main body that is disposed at the other side in the arm width direction of the lateral inflection portion. Therefore, the washing fluid may easily be jetted directly in front of the wiper blade without being obstructed by the wiper blade. As a result, the jetted washing fluid may be wiped by the wiper blade immediately, and obstruction of a driver's field of vision by the impacted washing fluid may be prevented.

In the wiper arm according to the present invention, orientations of the respective jetting holes of the first nozzle portion and the third nozzle portion are specified so as to jet the washing fluid in mutually opposite directions with respect to the arm main body.

According to the wiper arm with the structure described above, the wiper blade is disposed at the arm width direction one side relative to the arm main body due to the lateral inflection portion at the length direction distal end side of the arm main body, and the jetting direction of the washing fluid jetted from the jetting hole of the first nozzle portion and the jetting direction of the washing fluid jetted from the jetting hole of the third nozzle portion are mutually opposite directions with respect to the arm main body. Therefore, even though the washing fluid that is supplied to the first line hose is continuously jetted in mutually opposite directions with respect to the arm main body, the washing fluid jetted from the jetting holes of the first nozzle portion and the third nozzle portion may impact at the same side with respect to the wiper blade.

In the wiper arm according to the present invention, the second nozzle portion is disposed at the one side in the arm width direction at the distal end side of the arm main body relative to the lateral inflection portion, and the arm main body includes a blade joining portion at the distal end side relative to the lateral inflection portion, a wiper blade being joined at the blade joining portion.

According to the wiper arm with the structure described above, because the second nozzle portion is disposed at the one side in the arm width direction at the distal end side relative to the lateral inflection portion of the arm main body, the second line hose connected to the second nozzle portion can be arranged to the side of the third nozzle portion that is disposed at the lateral inflection portion. Furthermore, relative to the wiper blade that is joined by the blade joining portion at the distal end side of the lateral inflection portion, the third nozzle portion is disposed at the other side in the arm width direction and the second nozzle portion is disposed at the one side in the arm width direction. Therefore, washing fluid supplied through the two line hoses may be jetted respectively and distinctly differently (for example, jetting timings, jetting pressures and the like may be made different) to both sides of the wiper blade.

A vehicle wiper apparatus according to the present invention includes: a pivot rod that receives a driving force and turns about an axis; a wiper arm according to any one of the aspects described above, a proximal end portion of the wiper arm being fixed to the pivot rod, and the wiper arm performing reciprocating motions along a wiped surface; and a wiper blade mounted at a distal end portion of the wiper arm, the wiper blade wiping the wiped surface.

According to the vehicle wiper apparatus with the structure described above, the pivot rod subjected to the driving force turns about the axis thereof. Thus, the wiper arm performs the reciprocating motions along the wiped surface, and the wiper blade mounted at the distal end portion of the wiper arm wipes the wiped surface.

In the wiper arm of the vehicle wiper apparatus with the structure described above, the two-line hoses are arranged within the arm main body, but the first line hose and second line hose are retained separately by the first hose retention portion and second hose retention portion of the hose retention unit. Thus, when the two lines of the hose are arranged side-by-side within the arm main body, the hose may be maintained in a stable state of arrangement, and an increase in a number of components may be suppressed.

The vehicle wiper apparatus according to the present invention includes a switching mechanism that selectively switches supply of the washing fluid to the first line hose or the second line hose such that the washing fluid is jetted to wiping direction forward sides of the wiper blade.

According to the vehicle wiper apparatus with the structure described above, the supply of washing fluid is selectively switched between the first line hose and the second line hose by the switching mechanism, and the washing fluid is jetted to the wiping direction forward sides of the wiper blade by this switching. Consequently, because the jetted washing fluid is promptly wiped by the wiper blade, cases of the impacted washing fluid staying in place for a relatively long time before being wiped can be prevented.

What is claimed is:

1. A wiper arm comprising:
   an arm main body, a cross-sectional shape thereof in a direction orthogonal to an arm length direction being a "U" shape;
   a first nozzle portion that is disposed at a first predetermined position in a length direction of the arm main body, and that is provided with a jetting hole for washing fluid;
   a second nozzle portion that is disposed at a second predetermined position in the length direction of the arm main body, and that is provided with a jetting hole that jets washing fluid toward a position that is different from an impact point of the washing fluid jetted from the jetting hole of the first nozzle portion;
   a first line hose that is accommodated in the arm main body and that is connected to the first nozzle portion;
   a second line hose that is accommodated in the arm main body side-by-side with the first line hose and that is connected to the second nozzle portion; and
   a hose retention unit that is attached to the arm main body and that comprises:
      a first hose retention portion that retains the first line hose; and
      a second hose retention portion that is provided integrally with the first hose retention portion and retains the second line hose,
      wherein the first hose retention portion retains the first line hose in the arm main body due to the first line hose being connected to the first hose retention portion, and
      wherein the second hose retention portion projects from the first hose retention portion and forms a cavity portion between the second hose retention portion and an inner wall surface of the arm main body, and the second hose retention portion retains the second line hose in the arm main body due to the second line hose being arranged in the cavity portion.

2. The wiper arm according to claim 1, wherein the first nozzle portion is disposed at an intermediate position of the length direction of the arm main body, and the second nozzle portion is disposed at a distal end side of the arm main body.

3. The wiper arm according to claim 2, further comprising a third nozzle portion that is disposed at the distal end side of the length direction of the arm main body relative to the first nozzle portion, the third nozzle portion including a jetting hole that jets washing fluid toward a position that is different from an impact point of the washing fluid jetted from the jetting hole of the second nozzle portion,
   wherein the third nozzle portion and the first nozzle portion are in fluid communication with one another through the first line hose.

4. The wiper arm according to claim 3, further comprising a lateral inflection portion that is formed at the distal end side of the length direction of the arm main body, the lateral inflection portion inflecting to one side in the arm width direction, wherein the third nozzle portion is disposed at a side wall portion that is disposed at the other side in the arm width direction of the lateral inflection portion.

5. The wiper arm according to claim 4, wherein orientations of the respective jetting holes of the first nozzle portion and the third nozzle portion are specified so as to jet the washing fluid in mutually opposite directions with respect to the arm main body.

6. The wiper arm according to claim 4, wherein:

the second nozzle portion is disposed at the one side in the arm width direction at the distal end side of the arm main body relative to the lateral inflection portion, and the arm main body includes a blade joining portion at the distal end side relative to the lateral inflection portion, a wiper blade being adapted to be joined at the blade joining portion.

7. The wiper arm according to claim 1, wherein the first nozzle portion is provided integrally with the hose retention unit.

8. The wiper arm according to claim 1, wherein the first nozzle portion includes the hose retention unit that includes the first hose retention portion and the second hose retention portion.

9. The wiper arm according to a claim 1, wherein:

a first engaging portion is formed at an outer side in the arm width direction of the first hose retention portion, the first engaging portion engaging with a first engaged portion formed at a side wall portion at one side of the arm main body, a second engaging portion is formed at an outer side in the arm width direction of the second hose retention portion, the second engaging portion engaging with a second engaged portion formed at a side wall portion at another side of the arm main body, and the second hose retention portion is constituted to be resiliently deformable along the projection direction thereof.

10. A vehicle wiper apparatus comprising:

a pivot rod that receives a driving force and turns about an axis;

a wiper arm according to claim 1, a proximal end portion of the wiper arm being fixed to the pivot rod, and the wiper arm performing reciprocating motions along a wiped surface; and a wiper blade mounted at a distal end portion of the wiper arm, the wiper blade wiping the wiped surface.

11. The vehicle wiper apparatus according to claim 10, further comprising a switching mechanism that selectively switches supply of the washing fluid to the first line hose or the second line hose such that the washing fluid is jetted to wiping direction forward sides of the wiper blade.

* * * * *